US011651668B2

(12) United States Patent
Scalisi et al.

(10) Patent No.: US 11,651,668 B2
(45) Date of Patent: May 16, 2023

(54) DOORBELL COMMUNITIES

(71) Applicant: SKYBELL TECHNOLOGIES IP, LLC, Irvine, CA (US)

(72) Inventors: Joseph Frank Scalisi, Yorba Linda, CA (US); Desiree Mejia, Yorba Linda, CA (US); Gregory Saul Harrison, Aliso Viejo, CA (US); Andrew Paul Thomas, San Francisco, CA (US)

(73) Assignee: SkyBell Technologies IP, LLC, Irvine, CA (US)

( * ) Notice: Subject to any disclaimer, the term of this patent is extended or adjusted under 35 U.S.C. 154(b) by 134 days.

(21) Appl. No.: 16/926,531

(22) Filed: Jul. 10, 2020

(65) Prior Publication Data

US 2020/0342727 A1 Oct. 29, 2020

Related U.S. Application Data

(63) Continuation of application No. 15/793,720, filed on Oct. 25, 2017, now abandoned, which is a
(Continued)

(51) Int. Cl.
*H04N 7/18* (2006.01)
*G06F 3/04842* (2022.01)
(Continued)

(52) U.S. Cl.
CPC ..... *G08B 13/19695* (2013.01); *G06F 16/955* (2019.01); *G06V 10/95* (2022.01);
(Continued)

(58) Field of Classification Search
CPC ............... G08B 13/19695; G08B 3/10; G08B 13/19684; G08B 27/003; G08B 7/064;
(Continued)

(56) References Cited

U.S. PATENT DOCUMENTS 1,647,558 A 11/1927 Best
1,647,708 A 11/1927 Monica
(Continued)

FOREIGN PATENT DOCUMENTS

CN 2131143 Y 4/1993
CN 1704985 A 12/2005
(Continued)

OTHER PUBLICATIONS

Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
(Continued)

*Primary Examiner* — Joseph W Becker
(74) *Attorney, Agent, or Firm* — Gallium Law; Wesley Schwie, Esq.; Justin Schwechter

(57) ABSTRACT

Doorbells can send data to each other to enable a first doorbell user to warn a second doorbell user regarding a suspicious visitor. A first user can indicate a first trait of a visitor via a first remote computing device. The first user can create a user group to enable the members of the user group to use their doorbells to take pictures of suspicious visitors and to send the pictures of the suspicious visitors to other members of the user group.

20 Claims, 10 Drawing Sheets

Related U.S. Application Data continuation-in-part of application No. 15/789,121, filed on Oct. 20, 2017, now Pat. No. 11,004,312.

(51) Int. Cl.

| | | |
|---|---|---|
| *G06F 3/04817* | (2022.01) | |
| *G06V 40/20* | (2022.01) | |
| *G08B 13/196* | (2006.01) | |
| *G06F 16/955* | (2019.01) | |
| *H04L 12/28* | (2006.01) | |
| *H04M 11/02* | (2006.01) | |
| *G08B 27/00* | (2006.01) | |
| *G08B 3/10* | (2006.01) | |
| *G08C 17/02* | (2006.01) | |
| *G06V 10/94* | (2022.01) | |
| *G06V 20/52* | (2022.01) | |
| *G07C 9/25* | (2020.01) | |
| *G08B 15/00* | (2006.01) | |
| *G08B 19/00* | (2006.01) | |
| *G08B 7/06* | (2006.01) | |
| *G06V 40/16* | (2022.01) | |

(52) U.S. Cl.
CPC .............. *G06V 20/52* (2022.01); *G08B 3/10* (2013.01); *G08B 13/19684* (2013.01); *G08B 27/003* (2013.01); *G08C 17/02* (2013.01); *H04L 12/2818* (2013.01); *H04L 12/2823* (2013.01); *H04L 12/2825* (2013.01); *H04M 11/025* (2013.01); *H04N 7/181* (2013.01); *H04N 7/186* (2013.01); *G06F 3/04817* (2013.01); *G06F 3/04842* (2013.01); *G06V 40/172* (2022.01); *G06V 40/20* (2022.01); *G07C 9/253* (2020.01); *G08B 7/064* (2013.01); *G08B 15/00* (2013.01); *G08B 19/00* (2013.01); *H04L 2012/2841* (2013.01); *H04L 2012/2849* (2013.01)

(58) Field of Classification Search
CPC ....... G08B 15/00; G08B 19/00; G06F 16/955; G06F 3/04817; G06F 3/04842; G06V 10/95; G06V 20/52; G06V 40/172; G06V 40/20; G08C 17/02; H04L 12/2818; H04L 12/2823; H04L 12/2825; H04L 2012/2841; H04L 2012/2849; H04L 12/282; H04L 2012/2847; H04M 11/025; H04N 7/181; H04N 7/186; G07C 9/253; G07C 9/00174

See application file for complete search history.

(56) References Cited

U.S. PATENT DOCUMENTS

| | | | |
|---|---|---|---|
| 3,240,113 | A | 3/1966 | Stechemesser |
| 3,708,742 | A | 1/1973 | Gunn |
| 4,523,193 | A | 6/1985 | Levinson |
| D283,130 | S | 3/1986 | Boenning |
| D297,222 | S | 8/1988 | Rauch |
| 4,843,461 | A | 6/1989 | Tatsumi |
| 4,982,092 | A | 1/1991 | Jehle |
| 5,210,520 | A | 5/1993 | Housley |
| 5,428,388 | A | 6/1995 | Von Bauer |
| 5,493,618 | A | 2/1996 | Stevens |
| 5,521,578 | A | 5/1996 | Delvalle |
| D371,086 | S | 6/1996 | Collins |
| 5,602,580 | A | 2/1997 | Tseng |
| D381,638 | S | 7/1997 | Kruse |
| 5,774,569 | A | 6/1998 | Waldenmaier |
| 5,781,108 | A | 7/1998 | Jacob |
| 5,784,446 | A | 7/1998 | Stuart |
| D404,673 | S | 1/1999 | Gordon |
| 5,907,352 | A | 5/1999 | Gilley |
| 5,995,139 | A | 11/1999 | Lee |
| 6,028,626 | A | 2/2000 | Aviv |
| D421,727 | S | 3/2000 | Pierson |
| D422,521 | S | 4/2000 | Morrow |
| 6,073,192 | A | 6/2000 | Clapp |
| 6,094,213 | A | 7/2000 | Mun |
| 6,185,294 | B1 | 2/2001 | Chornenky |
| 6,226,031 | B1 | 5/2001 | Barraclough |
| 6,313,743 | B1 | 11/2001 | Abraham-Fuchs |
| 6,375,366 | B1 | 4/2002 | Kato |
| 6,414,589 | B1 | 7/2002 | Angott |
| 6,429,893 | B1 | 8/2002 | Xin |
| 6,535,243 | B1 | 3/2003 | Tullis |
| 6,542,078 | B2 | 4/2003 | Script |
| 6,590,604 | B1 | 7/2003 | Tucker |
| 6,661,340 | B1 | 12/2003 | Saylor |
| 6,727,811 | B1 | 4/2004 | Fendis |
| 6,753,899 | B2 | 6/2004 | Lapalme |
| 6,778,084 | B2 | 8/2004 | Chang |
| 6,812,970 | B1 | 11/2004 | McBride |
| 6,828,909 | B2 | 12/2004 | Script |
| D500,751 | S | 1/2005 | Yukikado |
| D501,652 | S | 2/2005 | Pierson |
| 6,870,488 | B1 | 3/2005 | Compton |
| 6,928,461 | B2 | 8/2005 | Tuli |
| 6,930,599 | B2 | 8/2005 | Naidoo |
| 6,993,123 | B1 | 1/2006 | Allen |
| 7,015,943 | B2 | 3/2006 | Chiang |
| D519,100 | S | 4/2006 | Shioya |
| D522,490 | S | 6/2006 | Yukikado |
| D525,963 | S | 8/2006 | Yukikado |
| 7,113,578 | B2 | 9/2006 | Unger |
| D531,160 | S | 10/2006 | Yukikado |
| 7,154,531 | B2 | 12/2006 | Laird |
| 7,193,644 | B2 | 3/2007 | Carter |
| 7,218,220 | B1 | 5/2007 | Bovsun |
| D562,306 | S | 2/2008 | Jeong |
| 7,330,112 | B1 | 2/2008 | Emigh |
| 7,330,649 | B2 | 2/2008 | Finizio |
| 7,375,492 | B2 | 5/2008 | Calhoon |
| D577,301 | S | 9/2008 | Johnson |
| 7,429,924 | B2 | 9/2008 | Langer |
| 7,440,025 | B2 | 10/2008 | Cheng |
| 7,460,149 | B1 | 12/2008 | Donovan |
| 7,477,134 | B2 | 1/2009 | Langer |
| 7,486,271 | B2 | 2/2009 | Hershkovitz |
| 7,492,303 | B1 | 2/2009 | Levitan |
| D588,574 | S | 3/2009 | Takahata |
| 7,526,102 | B2 | 4/2009 | Ozer |
| D595,260 | S | 6/2009 | Takahata |
| 7,583,191 | B2 | 9/2009 | Zinser |
| 7,701,171 | B2 | 4/2010 | Defant |
| 7,738,917 | B2 | 6/2010 | Ryley |
| 7,746,223 | B2 | 6/2010 | Howarter |
| 7,751,285 | B1 | 7/2010 | Cain |
| 7,752,070 | B2 | 7/2010 | Hatcher |
| 7,809,966 | B2 | 10/2010 | Imao |
| 7,826,729 | B2 | 11/2010 | Cullen |
| 7,956,576 | B2 | 6/2011 | Neu |
| 7,991,381 | B1 | 8/2011 | Dunne |
| 7,991,575 | B2 | 8/2011 | Vogel |
| 8,016,676 | B2 | 9/2011 | Carter |
| 8,125,329 | B1 | 2/2012 | Hirou |
| 8,139,098 | B2 | 3/2012 | Carter |
| 8,144,183 | B2 | 3/2012 | Carter |
| 8,144,184 | B2 | 3/2012 | Carter |
| 8,154,581 | B2 | 4/2012 | Carter |
| 8,164,614 | B2 | 4/2012 | Carter |
| D660,819 | S | 5/2012 | Chen |
| 8,193,919 | B2 | 6/2012 | Langer |
| 8,224,311 | B2 | 7/2012 | Majmundar |
| 8,237,574 | B2 | 8/2012 | Anderson |
| 8,334,656 | B2 | 12/2012 | Weiss |
| 8,354,914 | B2 | 1/2013 | Buckingham |
| 8,504,103 | B2 | 8/2013 | Ficquette |
| D689,828 | S | 9/2013 | Pierson |
| 8,562,158 | B2 | 10/2013 | Chien |

(56) References Cited

U.S. PATENT DOCUMENTS

| | | |
|---|---|---|
| 8,565,399 B2 | 10/2013 | Siminoff |
| D692,847 S | 11/2013 | Barley |
| 8,630,452 B2 | 1/2014 | Mardirossian |
| 8,665,333 B1 | 3/2014 | Sharma |
| 8,669,876 B2 | 3/2014 | Anderson |
| D707,147 S | 6/2014 | Crippa |
| 8,780,201 B1 | 7/2014 | Scalisi |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi |
| 8,842,180 B1 | 9/2014 | Kasmir |
| 8,866,598 B2 | 10/2014 | Collins |
| 8,872,915 B1 | 10/2014 | Scalisi |
| 8,875,208 B1 | 10/2014 | Abkairov |
| 8,937,659 B1 | 1/2015 | Scalisi |
| 8,941,736 B1 | 1/2015 | Scalisi |
| 8,947,530 B1 | 2/2015 | Scalisi |
| 8,953,040 B1 | 2/2015 | Scalisi |
| 8,976,244 B2 | 3/2015 | Felt |
| 9,013,575 B2 | 4/2015 | Scalisi |
| 9,021,134 B1 | 4/2015 | Patel |
| 9,049,352 B2 | 6/2015 | Scalisi |
| 9,053,622 B2 | 6/2015 | Scalisi |
| 9,055,202 B1 | 6/2015 | Scalisi |
| 9,057,210 B2 | 6/2015 | Dumas |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |
| 9,071,923 B2 | 6/2015 | Zhang |
| 9,113,051 B1 | 8/2015 | Scalisi |
| 9,113,052 B1 | 8/2015 | Scalisi |
| 9,142,214 B2 | 9/2015 | Scalisi |
| 9,172,922 B1 | 10/2015 | Kasmir |
| 9,196,104 B2 | 11/2015 | Dumas |
| 9,218,696 B2 | 12/2015 | Dumas |
| 9,230,424 B1 | 1/2016 | Scalisi |
| 9,282,665 B1 | 3/2016 | Ladanyi |
| 9,336,637 B2 | 5/2016 | Neil |
| 9,338,594 B1 | 5/2016 | Onnen |
| 9,584,775 B2 | 2/2017 | Siminoff |
| 9,615,199 B1 | 4/2017 | Haney |
| D788,061 S | 5/2017 | Siminoff |
| D789,404 S | 6/2017 | Modestine |
| D789,820 S | 6/2017 | Siminoff |
| 9,674,433 B1 | 6/2017 | De La Cruz |
| D791,165 S | 7/2017 | Modestine |
| D791,240 S | 7/2017 | Lemberger |
| D791,241 S | 7/2017 | Lemberger |
| D791,243 S | 7/2017 | Loew |
| D791,878 S | 7/2017 | Loew |
| 9,697,723 B1 | 7/2017 | Ladanyi |
| 9,734,675 B2 | 8/2017 | Siminoff |
| D798,177 S | 9/2017 | Siminoff |
| 9,761,092 B2 | 9/2017 | Chen |
| 9,810,887 B1 | 11/2017 | Abdala |
| 9,978,260 B2 | 5/2018 | Lee |
| 10,289,917 B1 | 5/2019 | Fu |
| 10,367,814 B2 | 7/2019 | Walker |
| 2001/0010555 A1 | 8/2001 | Driscoll |
| 2001/0022627 A1 | 9/2001 | Bernhardt |
| 2002/0097161 A1 | 7/2002 | Deeds |
| 2003/0009364 A1 | 1/2003 | Miyoshi |
| 2003/0025599 A1 | 2/2003 | Monroe |
| 2003/0081952 A1 | 5/2003 | Geng |
| 2003/0169178 A1 | 9/2003 | Jensen |
| 2004/0085205 A1 | 5/2004 | Yeh |
| 2004/0085449 A1 | 5/2004 | Millet |
| 2004/0086093 A1 | 5/2004 | Schranz |
| 2004/0095254 A1 | 5/2004 | Maruszczak |
| 2004/0117039 A1 | 6/2004 | Hantke |
| 2004/0178889 A1 | 9/2004 | Buckingham |
| 2004/0229569 A1 | 11/2004 | Franz |
| 2004/0257336 A1 | 12/2004 | Hershkovitz |
| 2005/0006528 A1 | 1/2005 | Movsesian |
| 2005/0007451 A1 | 1/2005 | Chiang |
| 2005/0040954 A1 | 2/2005 | McNally |
| 2005/0046584 A1 | 3/2005 | Breed |
| 2005/0057361 A1 | 3/2005 | Giraldo |
| 2005/0071879 A1 | 3/2005 | Haldavnekar |
| 2005/0097248 A1 | 5/2005 | Kelley |
| 2005/0116480 A1 | 6/2005 | Deng |
| 2005/0237208 A1 | 10/2005 | Wojcik |
| 2005/0259641 A1 | 11/2005 | Beninato |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0187034 A1 | 8/2006 | Styers |
| 2006/0195872 A1 | 8/2006 | Seo |
| 2006/0271678 A1 | 11/2006 | Jessup |
| 2006/0273895 A1 | 12/2006 | Kollin |
| 2007/0008081 A1 | 1/2007 | Tylicki |
| 2007/0012602 A1 | 1/2007 | Baldassari |
| 2007/0025712 A1 | 2/2007 | Jezierski |
| 2007/0029486 A1 | 2/2007 | Zhevelev |
| 2007/0046442 A1 | 3/2007 | Bartorelli |
| 2007/0052531 A1 | 3/2007 | Matthews |
| 2007/0066316 A1 | 3/2007 | Hoover |
| 2007/0103541 A1 | 5/2007 | Carter |
| 2007/0109441 A1 | 5/2007 | Cheng |
| 2007/0118831 A1 | 5/2007 | Kondo |
| 2007/0126574 A1 | 6/2007 | Langer |
| 2007/0132413 A1 | 6/2007 | Mays |
| 2007/0146115 A1 | 6/2007 | Roosli |
| 2007/0146122 A1 | 6/2007 | Ratner |
| 2007/0176778 A1 | 8/2007 | Ando |
| 2007/0194945 A1 | 8/2007 | Atkinson |
| 2007/0206510 A1 | 9/2007 | Morris |
| 2007/0216764 A1 | 9/2007 | Kwak |
| 2007/0237358 A1 | 10/2007 | Tseng |
| 2008/0004995 A1 | 1/2008 | Klingenberg |
| 2008/0028063 A1 | 1/2008 | Holmes |
| 2008/0036862 A1 | 2/2008 | Lang |
| 2008/0047287 A1 | 2/2008 | Ruppert |
| 2008/0128586 A1 | 6/2008 | Johnson |
| 2008/0129498 A1 | 6/2008 | Howarter |
| 2008/0129825 A1 | 6/2008 | Deangelis |
| 2008/0136915 A1 | 6/2008 | Iwamura |
| 2008/0145050 A1 | 6/2008 | Mayer |
| 2008/0157936 A1 | 7/2008 | Ebrom |
| 2008/0157956 A1 | 7/2008 | Radivojevic |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0167862 A1 | 7/2009 | Jentoft |
| 2009/0207249 A1 | 8/2009 | Erel |
| 2009/0213208 A1 | 8/2009 | Glatt |
| 2009/0243852 A1 | 10/2009 | Haupt |
| 2009/0273670 A1 | 11/2009 | Tamayo |
| 2009/0284578 A1 | 11/2009 | Carter |
| 2009/0296641 A1 | 12/2009 | Bienas |
| 2009/0302995 A1 | 12/2009 | Park |
| 2009/0308116 A1 | 12/2009 | Lambrou |
| 2010/0087161 A1 | 4/2010 | Young |
| 2010/0103300 A1 | 4/2010 | Jones |
| 2010/0109903 A1 | 5/2010 | Carrick |
| 2010/0134072 A1 | 6/2010 | Neu |
| 2010/0141761 A1 | 6/2010 | McCormack |
| 2010/0195810 A1 | 8/2010 | Mota |
| 2010/0225455 A1 | 9/2010 | Claiborne |
| 2010/0245060 A1 | 9/2010 | Tylicki |

(56) References Cited

U.S. PATENT DOCUMENTS

| | | |
|---|---|---|
| 2010/0276570 A1 | 11/2010 | Moser |
| 2010/0289661 A1 | 11/2010 | Styers |
| 2011/0025852 A1 | 2/2011 | Tanaka |
| 2011/0028118 A1 | 2/2011 | Thomas |
| 2011/0074570 A1 | 3/2011 | Feldstein |
| 2011/0090085 A1 | 4/2011 | Belz |
| 2011/0121940 A1 | 5/2011 | Jones |
| 2011/0140845 A1 | 6/2011 | Sanders |
| 2011/0156566 A1 | 6/2011 | Chen |
| 2011/0207509 A1 | 8/2011 | Crawford |
| 2011/0221582 A1 | 9/2011 | Chuey |
| 2011/0260880 A1 | 10/2011 | Dean |
| 2011/0264405 A1 | 10/2011 | Vogel |
| 2011/0287718 A1 | 11/2011 | Abel |
| 2011/0313775 A1 | 12/2011 | Laligand |
| 2012/0011559 A1 | 1/2012 | Miettinen |
| 2012/0027248 A1 | 2/2012 | Feris |
| 2012/0030133 A1 | 2/2012 | Rademaker |
| 2012/0044049 A1 | 2/2012 | Vig |
| 2012/0044050 A1 | 2/2012 | Vig |
| 2012/0044085 A1 | 2/2012 | Hung |
| 2012/0085824 A1 | 4/2012 | Handshaw |
| 2012/0098439 A1 | 4/2012 | Recker |
| 2012/0105631 A1 | 5/2012 | Hutchings |
| 2012/0108215 A1 | 5/2012 | Kameli |
| 2012/0113253 A1 | 5/2012 | Slater |
| 2012/0127308 A1 | 5/2012 | Eldershaw |
| 2012/0162416 A1 | 6/2012 | Su |
| 2012/0182427 A1 | 7/2012 | Marshall |
| 2012/0200942 A1 | 8/2012 | Schmidt |
| 2012/0229282 A1 | 9/2012 | Zagami |
| 2012/0230203 A1 | 9/2012 | Casey |
| 2012/0230696 A1 | 9/2012 | Pederson |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0293310 A1 | 11/2012 | Fitzgibbon |
| 2012/0320150 A1 | 12/2012 | Montgomery |
| 2012/0327225 A1 | 12/2012 | Barley |
| 2012/0327246 A1 | 12/2012 | Senior |
| 2013/0017812 A1 | 1/2013 | Foster |
| 2013/0020875 A1 | 1/2013 | Wozniak |
| 2013/0039499 A1 | 2/2013 | Patenaude |
| 2013/0045763 A1 | 2/2013 | Ruiz |
| 2013/0057695 A1 | 3/2013 | Huisking |
| 2013/0057696 A1 | 3/2013 | Felt |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147616 A1 | 6/2013 | Lambert |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0223833 A1 | 8/2013 | Tenenbaum |
| 2013/0286211 A1 | 10/2013 | Cao |
| 2013/0293722 A1 | 11/2013 | Chen |
| 2013/0328522 A1 | 12/2013 | Brockman |
| 2013/0335219 A1 | 12/2013 | Malkowski |
| 2014/0009609 A1 | 1/2014 | Webster |
| 2014/0015967 A1 | 1/2014 | Moore |
| 2014/0070922 A1 | 3/2014 | Davis |
| 2014/0077929 A1 | 3/2014 | Dumas |
| 2014/0087780 A1 | 3/2014 | Abhyanker |
| 2014/0088761 A1 | 3/2014 | Shamlian |
| 2014/0118600 A1 | 5/2014 | Son |
| 2014/0125754 A1 | 5/2014 | Haywood |
| 2014/0149706 A1 | 5/2014 | Shim |
| 2014/0167676 A1 | 6/2014 | Mack |
| 2014/0188643 A1 | 7/2014 | Murphy |
| 2014/0210590 A1 | 7/2014 | Castro |
| 2014/0253725 A1 | 9/2014 | Hsu |
| 2014/0260449 A1 | 9/2014 | Uyeda |
| 2014/0265359 A1 | 9/2014 | Cheng |
| 2014/0266669 A1 | 9/2014 | Fadell |
| 2014/0266767 A1 | 9/2014 | Huang |
| 2014/0267716 A1 | 9/2014 | Child |
| 2014/0267740 A1 | 9/2014 | Almomani |
| 2014/0285672 A1 | 9/2014 | Hogasten |
| 2014/0292194 A1 | 10/2014 | Sagal |
| 2014/0292481 A1 | 10/2014 | Dumas |
| 2014/0320663 A1 | 10/2014 | Chien |
| 2014/0334684 A1 | 11/2014 | Strimling |
| 2014/0340894 A1 | 11/2014 | Chien |
| 2014/0368643 A1 | 12/2014 | Siegel |
| 2015/0022319 A1 | 1/2015 | Chutorash |
| 2015/0022618 A1 | 1/2015 | Siminoff |
| 2015/0022620 A1 | 1/2015 | Siminoff |
| 2015/0027178 A1 | 1/2015 | Scalisi |
| 2015/0029335 A1 | 1/2015 | Kasmir |
| 2015/0035987 A1 | 2/2015 | Fernandez |
| 2015/0049191 A1 | 2/2015 | Scalisi |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0077220 A1 | 3/2015 | Davis |
| 2015/0084779 A1 | 3/2015 | Saladin |
| 2015/0092055 A1 | 4/2015 | Scalisi |
| 2015/0109104 A1 | 4/2015 | Fadell |
| 2015/0109111 A1 | 4/2015 | Lee |
| 2015/0109112 A1 | 4/2015 | Fadell |
| 2015/0112885 A1 | 4/2015 | Fadell |
| 2015/0120015 A1 | 4/2015 | Fadell |
| 2015/0120598 A1 | 4/2015 | Fadell |
| 2015/0127712 A1 | 5/2015 | Fadell |
| 2015/0145991 A1 | 5/2015 | Russell |
| 2015/0156030 A1 | 6/2015 | Fadell |
| 2015/0156031 A1* | 6/2015 | Fadell ................ G08B 29/185 700/90 |
| 2015/0161856 A1 | 6/2015 | Wilson |
| 2015/0163463 A1 | 6/2015 | Hwang |
| 2015/0179031 A1 | 6/2015 | Wallace |
| 2015/0185964 A1 | 7/2015 | Stout |
| 2015/0194839 A1 | 7/2015 | Wojcik |
| 2015/0208032 A1 | 7/2015 | Gavney |
| 2015/0211259 A1 | 7/2015 | Dumas |
| 2015/0213658 A1 | 7/2015 | Dumas |
| 2015/0228281 A1 | 8/2015 | Raniere |
| 2015/0236966 A1 | 8/2015 | Francini |
| 2015/0275564 A1 | 10/2015 | Rosenthal |
| 2015/0276266 A1 | 10/2015 | Warren |
| 2015/0309487 A1 | 10/2015 | Lyman |
| 2015/0310381 A1 | 10/2015 | Lyman |
| 2015/0312531 A1 | 10/2015 | Samad |
| 2015/0338812 A1 | 11/2015 | Miura |
| 2015/0339895 A1 | 11/2015 | Chen |
| 2015/0347910 A1 | 12/2015 | Fadell |
| 2016/0001719 A1 | 1/2016 | Frost |
| 2016/0019495 A1 | 1/2016 | Kolchin |
| 2016/0057199 A1 | 2/2016 | Aziz |
| 2016/0058181 A1 | 3/2016 | Han |
| 2016/0073479 A1 | 3/2016 | Erchak |
| 2016/0078699 A1 | 3/2016 | Kalb |
| 2016/0104061 A1 | 4/2016 | McGill |
| 2016/0105644 A1 | 4/2016 | Smith |
| 2016/0125357 A1 | 5/2016 | Hall |
| 2016/0171435 A1 | 6/2016 | Newton |
| 2016/0171439 A1 | 6/2016 | Ladden |
| 2016/0191864 A1 | 6/2016 | Siminoff |
| 2016/0219254 A1 | 7/2016 | Hu |
| 2016/0235236 A1 | 8/2016 | Byers |
| 2016/0247344 A1 | 8/2016 | Eichenblatt |
| 2016/0261425 A1 | 9/2016 | Horton |
| 2016/0292936 A1 | 10/2016 | Palmer |
| 2016/0300187 A1 | 10/2016 | Kashi |
| 2016/0307380 A1 | 10/2016 | Ho |

(56) References Cited

U.S. PATENT DOCUMENTS

| | | |
|---|---|---|
| 2016/0330403 A1 | 11/2016 | Siminoff |
| 2016/0366373 A1 | 12/2016 | Siminoff |
| 2017/0023780 A1 | 1/2017 | Braker |
| 2017/0064504 A1 | 3/2017 | Jose |
| 2017/0109984 A1 | 4/2017 | Child |
| 2017/0124510 A1 | 5/2017 | Caterino |
| 2017/0149855 A1 | 5/2017 | Doshi |
| 2017/0160137 A1 | 6/2017 | Jeong |
| 2017/0160138 A1 | 6/2017 | Jeong |
| 2017/0160144 A1 | 6/2017 | Jeong |
| 2017/0162225 A1 | 6/2017 | Jeong |
| 2017/0163944 A1 | 6/2017 | Jeong |
| 2017/0220872 A1 | 8/2017 | Child |
| 2017/0251035 A1 | 8/2017 | Siminoff |
| 2017/0251173 A1 | 8/2017 | Siminoff |
| 2017/0251182 A1 | 8/2017 | Siminoff |
| 2017/0272706 A1 | 9/2017 | Jeong |
| 2017/0280112 A1 | 9/2017 | Siminoff |
| 2017/0280565 A1 | 9/2017 | Tso |
| 2017/0293883 A1 | 10/2017 | Li |
| 2017/0294694 A1 | 10/2017 | Tso |
| 2018/0019889 A1 | 1/2018 | Burns |

FOREIGN PATENT DOCUMENTS

| | | |
|---|---|---|
| CN | 1902609 B | 5/2010 |
| CN | 202872976 U | 4/2013 |
| CN | 202939738 U | 5/2013 |
| EP | 0684743 B1 | 11/1995 |
| GB | 2400958 B | 7/2005 |
| WO | 2001093220 A1 | 12/2001 |
| WO | 2007111802 A2 | 10/2007 |
| WO | 2014062321 A1 | 4/2014 |
| WO | 2014107196 A1 | 7/2014 |
| WO | 2014144628 A2 | 9/2014 |
| WO | 2015023737 A1 | 2/2015 |
| WO | 2016032217 A1 | 3/2016 |

OTHER PUBLICATIONS

MyIntercom Video System—Downloaded on Jun. 8, 2015 from http://myintercom.de/en/funktionsweise.

Kocchi's Cobell Wi-Fi Doorbell—Downloaded on Sep. 14, 2015 from http://www.kocchis.com/Cobell_Manual.pdf.

August Doorbell Cam—Downloaded on Nov. 12, 2015 from http://august.com/products/august-doorbell/.

Nest Home Index—Downloaded on Nov. 12, 2015 from https://nest.com/blog/2015/11/09/the-first-nest-home-index/?utm_medium=paid%20social&utm_source=Facebook&utm_campaign=Nest%20Home%20Index&utm_content=Launch%20post.

Engadget—Amazon partners are reportedly exploring in-home deliveries—Downloaded on Oct. 19, 2017 from https://www.engadget.com/2016/09/27/amazon-august-garageio-inhome/; prior art publication at least as of Sep. 27, 2016.

Logittech—Logitech Circle 2—Downloaded on Oct. 19, 2017 from from https://www.logitech.com/en-us/product/circle-2-home-security-camera; prior art publication at least as of Jul. 26, 2017.

NY Times—Was That an Intruder or a Pet? The Security Cams That Can Tell—Downloaded on Oct. 19, 2017 from https://www.nytimes.com/2017/08/09/technology/personaltech/internet-connected-security-cameras-wirecutter.html?rref=collection%2Fsectioncollection%2Fpersonaltech; prior art publication at least as of Aug. 10, 2017.

Wisenet—SmartCam D1—Downloaded on Oct. 19, 2017 from http://www.wisenetlife.com/en-us/product/SmartCam/SNH-V6435DN;jsessionid=023065D418C9E9CA7335F6D9B4E2C8DC/faq/?currtPg=4; prior art publication at least as of Sep. 23, 2017.

Nortek Control—Go Control: Smart Doorbell Camera—Downloaded on Oct. 19, 2017 from https://www.nortekcontrol.com/pdf/literature/GC-DBC-1-GoControl-Smart-Doorbell-Camera-Spec-Sheet.pdf; prior art publication at least as of Dec. 18, 2016.

HSN—Samsung SmartCam High-Definition Video Doorbell—Downloaded on Oct. 25, 2017 from https://www.hsn.com/products/samsung-smartcam-high-definition-video-doorbell/8534791; prior art publication at least as of Oct. 22, 2017.

Wirecutter—The Best Smart Doorbell Camera—Downloaded on Oct. 25, 2017 from https://thewirecutter.com/reviews/best-smart-doorbell-camera/; prior art publication at least as of Oct. 19, 2017.

Newsday—Google's Nest launches video doorbell, new security system—Downloaded on Oct. 25, 2017 from https://www.newsday.com/lifestyle/google-s-nest-launches-video-doorbell-new-security-system-1.14498694; prior art publication at least as of Oct. 18, 2017.

ZD Net—Amazon to develop a smart doorbell to deliver packages inside your home—Downloaded on Oct. 25, 2017 from http://www.zdnet.com/article/amazon-plans-to-develop-smart-doorbell-to-deliver-packages-inside-your-home/; prior art publication at least as of Oct. 11, 2017.

Dealerscope—Petra Named Exclusive Distributor for New Uniden U-Bell DB1 Wireless Video Doorbell—Downloaded on Oct. 25, 2017 from http://www.dealerscope.com/article/petra-named-exclusive-distributor-new-uniden-u-bell-db1-wireless-video-doorbell/; prior art publication at least as of Oct. 3, 2017.

Nest—Say hello to Nest Hello—Downloaded on Oct. 25, 2017 from https://nest.com/blog/2017/09/20/say-hello-to-nest-hello/?utm_campaign=nest%20hello%20preannounce&utm_source=nest%20customers&utm_medium=m-email&utm_content=learn%20more, prior art publication at least as of Sep. 27, 2017.

Gate: Your Personal Doorman—Downloaded on Oct. 25, 2017 from https://www.indiegogo.com/projects/gate-your-personal-doorman#/; prior art publication at least as of Sep. 25, 2017.

Mashable—Walmart is teaming with a smart lock startup to deliver food straight to your fridge—Downloaded on Oct. 25, 2017 from http://mashable.com/2017/09/24/walmart-smart-lock-grocery-delivery/#7b0i0W4L_mqf; prior art publication at least as of Sep. 24, 2017.

Wired—Review: August Smart Lock—Downloaded on Oct. 25, 2017 from https://www.wired.com/2017/09/review-august-smart-lock/; prior art publication at least as of Sep. 24, 2017.

Amazon—Amazon Key—Downloaded on Oct. 25, 2017 from https://www.amazon.com/b?ie=UTF8&node=17285120011.

Amazon—Amazon Key In-Home Kit includes: Amazon Cloud Cam (Key Edition) indoor security camera and compatible smart lock—Downloaded on Oct. 25, 2017 from https://www.amazon.com/dp/B00KCYQGXE?locationCheckInvoked=1.

Amazon—Amazon Cloud Cam Indoor Security Camera, works with Alexa—Downloaded on Oct. 25, 2017 from https://www.amazon.com/Amazon-Cloud-Indoor-Security-Camera/dp/B01C4UY0JK/ref=sr_tr_1?s=amazon-devices&ie=UTF8&qid=1508945752&sr=1-1&keywords=amazon+cloud+cam.

Best Buy—Vivint Smart Home—Downloaded on Oct. 25, 2017 from https://www.bestbuy.com/site/home-security-solutions/smart-home/pcmcat748302047019.c?id=pcmcat748302047019&ref=P30T29R169&loc=BODY&CampaignID=860152&eut=2387920889; prior art publication at least as of Aug. 25, 2017.

Ring—Chime Pro—Downloaded on Oct. 25, 2017 from https://ring.com/chime-pro; prior art publication at least as of Aug. 23, 2017.

Twice—Samsung Wisenet SmartCam D1 Video Doorbell—Downloaded on Oct. 25, 2017 from http://www.twice.com/news/smart-home/samsung-wisenet-smartcam-d1-video-doorbell/65643; prior art publication at least as of Jul. 31, 2017.

Tech Crunch—Ring adds three connected Spotlight Cams to its Floodlight Cam lineup—Downloaded on Oct. 25, 2017 from https://techcrunch.com/2017/07/31/ring-adds-three-connected-spotlight-cams-to-its-floodlight-cam-lineup/; prior art publication at least as of Aug. 2, 2017.

CNBC—This $200 'smart' doorbell will show you who (or what) is in front of your house at all times—Downloaded on Oct. 25, 2017 from https://www.cnbc.com/2017/07/23/ring-doorbell-2-review.html; prior art publication at least as of Jul. 23, 2017.

ZMODO—Greet Pro with Beam Alert—Downloaded on Oct. 25, 2017 from http://www.zmodo.com/greetpro-1080p-wifi-video-doorbell/.

(56) References Cited

OTHER PUBLICATIONS

August—August Doorbell Cam Pro—Downloaded on Oct. 25, 2017 from http://august.com/products/doorbell-camera/?utm_source=Owners+from+Salesforce&utm_campaign=83b33655ed-EMAIL_CAMPAIGN_2017_06_06&utm_medium=email&utm_term=0_15a5cc0eb8-83b33655ed-247286221&mc_cid=83b33655ed&mc_eid=9d1996d140; prior art publication at least as of Jun. 11, 2017.
ATT—August Wi-Fi Doorbell Cam—Downloaded on Oct. 25, 2017 from https://m.att.com/shopmobile/accessories/specialty-items/August_Wi-Fi_Doorbell_Cam/_jcr_content.html?referrer=https%253A%2F%2Fwww.google.com%2F; prior art publication at least as of Jun. 9, 2017.
Ding, a beautifully simple smart doorbell—Downloaded on Oct. 25, 2017 from https://www.indiegogo.com/projects/ding-a-beautifully-simple-smart-doorbell-home-technology#/; prior art publication at least as of Jun. 5, 2017.
Clare Controls—The Clare Video Doorbell—Downloaded on Oct. 25, 2017 from https://www.clarecontrols.com/video-doorbell; prior art publication at least as of Jun. 1, 2017.
Business Insider—The best security cameras you can buy for your home—Downloaded on Oct. 25, 2017 from http://www.businessinsider.com/best-security-camera-home/#the-best-home-security-camera-for-outdoors-and-indoors-2; prior art publication at least as of May 27, 2017.
Smanos—Smart Video Doorbell—Downloaded on Oct. 25, 2017 from http://www.smanos.com/doorbell; prior art publication at least as of May 22, 2017.
Ring—Products—Downloaded on Oct. 30, 2017 from https://ring.com/.
Honeywell RCWL105A1003/N Plug-in Wireless Doorbell / Door Chime and Push Button; Downloaded on Apr. 16, 2019 from https://www.amazon.com/Honeywell-RCWL105A1003-Plug-Wireless-Button/dp/B001G0MATM; Prior art at least as of Sep. 26, 2008.
Sado Tech Model C Wireless Doorbell Operating at over 500-feet Range with Over 50 Chimes, No Batteries Required for Receiver; Downloaded on Apr. 16, 2019 from https://www.amazon.com/SadoTech-Wireless-Doorbell-Operating-Batteries/dp/B00FR4YQYK; Prior art at least as of Oct. 10, 2013.
Zheludev; The life and times of the LED—a 100-year history; Nature Photonics; Apr. 2007, pp. 189-192; vol. 1; Nature Publishing Group; Retrieved Apr. 16, 2019.
Yam; Innovative Advances in LED Technology; Microelectronics journal; Nov. 9, 2004; pp. 129-137; vol. 36; Retrieved Apr. 16, 2019.
Perkin Elmer; LHi968—LHi 968 Dual Element Detector, Top Line; Prior art at least as of Mar. 18, 2007.
Perkin Elmer; Pyroelectric Infrared Detectors; Prior art at least as of Apr. 16, 2009.
Perkin Elmer; Dual Element Detector; Prior art at least as of Mar. 25, 2007.
IEEE Standards Association; IEEE 802.15.1-2002—IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs); Downloaded on Apr. 29, 2019 from https://standards.ieee.org/standard/802_15_1-2002.html; Prior art at least as of Jun. 14, 2002.
Bluetooth—Our History; Prior art least as of Oct. 17, 2013.
Nutone—LA600WH Door Chime—Installation & Operating Instructions; Downloaded on Apr. 29, 2019 from http://www.nutone.com/common/productDigitalAssethandler.ashx?id=5b25a40a-c56f-44bf-99d1-5b0c17f266e9; Prior art at least as of Sep. 18, 2013.
Nutone; LA600WH Universal Wired/Wireless MP3 Doorbell Mechanism, 6"w × 9-1/2"h × 2-1/4"d in White; Downloaded on Apr. 29, 2019 from http://www.nutone.com/products/product/e2562b0e-4fe5-432a-ac70-228953b19875; Prior art at least as of May 30, 2013.
InTune; InTune MP3 Door Chime Manual; Downloaded on Apr. 29, 2019 from https://www.heath-zenith.com/system/spree/documents/attachments/000/000/839/original/205371-02A.pdf?1436551434 ; Prior art at least as of 2013.

Nutone; College Pride Mechanism; Prior art at least as of Jun. 8, 2013.
SECO-LARM; Enforcer DP-236Q Wireless Video Door Phone Manual; Downloaded on Apr. 29, 2019 from http://www.seco-larm.com/image/data/A_Documents/02_Manuals/MiDP-236Q_150528.pdf.
Craig & Comapny—Home Tech: Doorbot—Downloaded on Nov. 18, 2013 from http://www.craigncompany.com/home-tech-doorbot/; prior art publication at least as of Jun. 10, 2013.
The Next Web—Hardware renaissance: A look at the Christie Street platform and doorbot video streaming doorbell—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Digital Trends—Doorbot wi-fi doorbell camera lets you see visitors on your smartphone—Downloaded on Nov. 18, 2013 from http://www.digitaltrends.com/lifestyle/doorbot-camera-see-visitors-smartphone/; prior art publication at least as of Dec. 9, 2012.
DoorBot website—Downloaded on Jul. 26, 2013 from http://www.getdoorbot.com.
DoorBot users manual—Downloaded on Nov. 18, 2013 from http://static.mydoorbot.com/DoorBot%20Users%20Manual%201.0.pdf.
DoorBot "fact sheet"—Downloaded on Nov. 18, 2013 from http://cdn.shopify.eom/s/files/1/0247/6501/files/DoorBotMediaKit.pdf?17037.
CellNock—Index page—Originally downloaded on Sep. 23, 2013 from http://cellnock.com/index.html; The website says CellNock is "patent pending".
CellNock website—downloaded on Nov. 18, 2013 from http://cellnock.com/; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
SkyBell—MySkyBell.com (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
Wireless Video Doorbell Pager—Downloaded on Aug. 9, 2013 from http://www.indiegogo.com/projects/wireless-video-doorbell-pager—4.
Lockitron—Downloaded on Jul. 24, 2013 from https://lockitron.com/preorder.
EyeTalk for Home—Downloaded May 24, 2013 from http://www.revolutionaryconceptsinc.com/forhome.html.
SmartBell—Downloaded on Dec. 5, 2013 from http://smartbell.co/.
SmartBell—A Doorbell for Smartphones, published by Scrambled Brains Tech, LLC., Oct. 1, 2013.
August Smart Lock—Downloaded on Jun. 10, 2014 from www.August.com.
August Smart Lock—Downloaded on Oct. 10, 2014 from www.August.com.
KEVO Lock—User guide—Downloaded on Jun. 10, 2014 from http://s7d5.scene7.com/is/content/BDHHI/Kwikset/Website%20Content/Kevo/kevo-userguide-kwikset_eng.pdf.
KEVO Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
AdaFruit—Lock-Style Solenoid—Downloaded on Aug. 22, 2014 from www.AdaFruit.com.
Wikipedia—Power Matters Alliance—Downloaded on Aug. 23, 2014 from www.wikipedia.com.
AdaFruit—Push-Pull Solenoid—Technical Details—Downloaded on Aug. 22, 2014 from www.AdaFruit.com.
Wikipedia—Qi—Downloaded on Aug. 23, 2014 from www.wikipedia.com.

(56) References Cited

OTHER PUBLICATIONS

TP-Link—Website—Downloaded on Jul. 15, 2014 from www.tp-link.us.
A HD Cameras—AC Adapter Spy Camera—Downloaded on Jun. 24, 2014 from ahdcameras.com.
Fanfare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Tech Crunch—Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
IChime—iChime Customizable Digital Chime System—Downloaded on Nov. 7, 2014 from http://www.ichime.com/.
Christie Street—Doorbot—Downloaded on Jun. 14, 2013 from https://christiestreet.com/products/doorbot.
IDoorcam—A Wi-Fi Enabled, Webcam Doorbell—Downloaded on Sep. 3, 2013 from http://www.idoorcam.com/.
Langer—Langer Doorbell Button Sized Light—Downloaded on Sep. 16, 2013 from http://www.youtube.com/watch?v=u9nNCm4tSYI.
Langer—Langer Doorbell Light—Downloaded on Sep. 16, 2013 from http://www.youtube.com/watch?v=6dbU-Gyjgx8.
SmartBell—SmartBell on Kickstarter—Downloaded on Feb. 28, 2014 from http://www.kickstarter.com/projects/1256599792/smartbell-wi-fi-doorbell-for-video-chats-to-ios-an.
DefenDoor—DefenDoor by Glate LLC—Downloaded on Dec. 11, 2014 from https://www.kickstarter.com/projects/85455040/defendoor-a-home-security-system-that-syncs-with-y.
CNET—Notifi by Chamberlain—Downloaded on Jan. 9, 2015 from http://www.cnet.com/products/chamberlain-notifi-video-door-chime/.
I-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
Doorbird—Downloaded on Jan. 23, 2015 from http://www.doorbird.com/.
Chui Doorbell—Downloaded on Jan. 23, 2015 from http://www.getchui.com/.
Tech Crunch—Chui Doorbell—Downloaded on Jan. 23, 2015 from http://techcrunch.com/2014/04/18/214-technologies-is-crowdfunding-a-smart-doorbell-called-chui/.
Giz Mag—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
CNET—Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Tech Crunch—Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
CNIPA—China National Intellectual Property Administration; Notification of the Third Office Action of CN Application No. IIE151535; dated Nov. 15, 2019.

\* cited by examiner

DOORBELL COMMUNITIES

CROSS-REFERENCE TO RELATED APPLICATIONS

The entire contents of the following application are incorporated by reference herein: U.S. Non-provisional patent application Ser. No. 15/793,720; filed Oct. 25, 2017; and entitled DOORBELL COMMUNITIES.

The entire contents of the following application are incorporated by reference herein: U.S. Non-Provisional patent application Ser. No. 15/789,121; filed Oct. 20, 2017; and entitled DOORBELL COMMUNITIES.

The entire contents of the following application are incorporated by reference herein: U.S. Non-Provisional patent application Ser. No. 14/861,613; filed Sep. 22, 2015; and entitled DOORBELL COMMUNICATION SYSTEMS AND METHODS.

The entire contents of the following application are incorporated by reference herein: U.S. Non-Provisional patent application Ser. No. 14/748,054; filed Jun. 23, 2015; and entitled DOORBELL COMMUNITIES.

The entire contents of the following application are incorporated by reference herein: U.S. Provisional Patent Application No. 62/143,032; filed Apr. 4, 2015; and entitled DOORBELL COMMUNITIES.

The entire contents of the following applications are incorporated by reference herein: U.S. Non-provisional patent application Ser. No. 14/612,376; filed Feb. 3, 2015; and entitled DOORBELL COMMUNICATION SYSTEMS AND METHODS.

The entire contents of the following applications are incorporated by reference herein: U.S. Nonprovisional patent application Ser. No. 14/502,601; filed Sep. 30, 2014; and entitled DOORBELL COMMUNICATION SYSTEMS AND METHODS.

The entire contents of the following applications are incorporated by reference herein: U.S. Nonprovisional patent application Ser. No. 14/492,809; filed Sep. 22, 2014; and entitled DOORBELL COMMUNICATION SYSTEMS AND METHODS.

The entire contents of the following applications are incorporated by reference herein: U.S. Nonprovisional patent application Ser. No. 14/275,811; filed May 12, 2014; and entitled DOORBELL COMMUNICATION SYSTEMS AND METHODS.

The entire contents of the following applications are incorporated by reference herein: U.S. Nonprovisional patent application Ser. No. 14/142,839; filed Dec. 28, 2013; and entitled DOORBELL COMMUNICATION SYSTEMS AND METHODS.

The entire contents of the following applications are incorporated by reference herein: U.S. Nonprovisional patent application Ser. No. 14/099,888; filed Dec. 6, 2013; and entitled DOORBELL COMMUNICATION SYSTEMS AND METHODS.

The entire contents of the following applications are incorporated by reference herein: and U.S. Nonprovisional patent application Ser. No. 14/098,772; filed Dec. 6, 2013; and entitled DOORBELL COMMUNICATION SYSTEMS AND METHODS.

The entire contents of the following application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

The entire contents of the following application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

BACKGROUND

Field

Various embodiments disclosed herein relate to doorbells. Certain embodiments relate to doorbell communities.

Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

SUMMARY

Data from multiple doorbells can be shared among a doorbell user group. Information regarding a visitor to a first building can be shared with other members of the doorbell user group. For example, a homeowner can share information from her doorbell with neighbors' remote computing devices via the doorbell user group even though the neighbors' remote computing devices are not configured to receive visitor alerts from the homeowner's doorbell each time the homeowner's doorbell detects a visitor (e.g., via motion detection or button press detection). Some embodiments include the homeowner (e.g., a user) choosing to send a first visit information (regarding a first visitor) to neighbor's remote computing devices and choosing not to send a second visit information (regarding a second visitor) to neighbor's remote computing devices. Thus, the system enables a user to selectively decide what visit information to share with members of the doorbell user group.

In some embodiments, the doorbell system can comprise a first remote computing device communicatively coupled to a first doorbell having a first camera. The method for using the doorbell system can comprise sending a first picture, taken by the first doorbell, of a first visitor to the first remote computing device. A doorbell user group can be created and can comprise a first user, of the first remote computing device, and a second user, of a second remote computing device. A second remote computing device can be communicatively coupled to a second doorbell, but may not necessarily be communicatively coupled to the first doorbell. The method for using the doorbell system can comprise sharing the first picture of the first visitor with the doorbell user group, such that the second remote computing device can receive the first picture. In several embodiments, the first remote computing device may not be communicatively coupled to the second doorbell. The method can comprise receiving, by the first remote computing device, a second picture taken by the second doorbell. The second picture can be taken in response to the second doorbell sending the second picture to a database. The database can be configured to provide visitor information to the doorbell user group.

In some embodiments, the method for using the doorbell system can comprise the indication of a first trait of the first visitor via the first remote computing device. The method can comprise sharing the first picture of the first visitor with the doorbell user group in response to the first trait of the first visitor.

In several embodiments, the method can comprise the indication of a first trait of the first visitor via the first remote computing device. The method can send the first trait and the first picture of the first visitor to a database. The database can be configured to provide information regarding the first visitor to the doorbell user group. The method can provide a time, at which the first visitor visited the first doorbell, to the database.

In some embodiments, the first remote computing device cannot be communicatively coupled to the second doorbell. The method for using the doorbell system can comprise receiving, by the first remote computing device, data from the doorbell user group regarding the second doorbell. The second doorbell can comprise a second camera. In some cases, a third doorbell can comprise a third camera. The second doorbell can be coupled to a second building, and the third doorbell can be coupled to a third building.

In several embodiments, the doorbell system can comprise a database configured to share visitor information with the doorbell user group. The method can comprise selecting, via the first remote computing device, to receive the visitor information from at least one of the second doorbell and the third doorbell.

In some embodiments, the first doorbell can be coupled to a first building. The first building, the second building, and the third building can be located apart from each other. Receiving the data can comprise receiving the visitor information from a different location than a first location of the first building.

In several embodiments, the first picture can comprise a first video. The first picture can also be a still image (although many users prefer pictures that are videos).

In some embodiments, creating the doorbell user group can comprise adding a first email address and a second email address to a database. The first email address can be associated with the first doorbell, and the second email address can be associated with the second doorbell. In several embodiments, the method for using the doorbell system can comprise displaying a map on the first remote computing device. The map can display a second location of the second doorbell and a third location of a third doorbell. The method can comprise displaying information, regarding the second doorbell, in response to selecting a map icon, representing the second doorbell, while the map icon is displayed on the first remote computing device. Selecting the map icon can be used to add the second user of the second doorbell to the doorbell user group. Methods can include sending an invitation (to join the user group) to the second user in response to selecting the second doorbell on the map.

In some embodiments, the method can comprise selecting a first button on the first remote computing device to alert law enforcement and/or to alert the doorbell user group.

In several embodiments, the first doorbell can be coupled to a first building. The second doorbell can be coupled to a second building. A third doorbell can be coupled to a third building. The buildings can be located remotely relative to each other. The method can comprise analyzing information collected from the first, second, and third doorbells, and then sending an alert in response to analytics based on the information. Analytics can include visitor identity, visit frequency (e.g., during a timeframe), time of visits, and facial recognition of visitors.

In some embodiments, a method of using a doorbell system can comprise coupling a first doorbell having a first camera to a first building, configuring the first doorbell to wirelessly communicate with a first remote computing device, and joining, by the first remote computing device, a doorbell user group. The doorbell user group can comprise a second user and a third user. The second user can comprise a second doorbell having a second camera coupled to a second building. A third user can comprise a third doorbell having a third camera coupled to a third building. The second doorbell can be configured to wirelessly communicate with a second remote computing device.

In several embodiments, the method of using the doorbell system can comprise receiving, by the first remote computing device, a first visitor picture. The second doorbell or the third doorbell can take the first visitor picture. The method can comprise receiving, from the doorbell user group by the first remote computing device, a first visitor picture taken by the second doorbell. The first remote computing device may not be communicatively coupled to the second doorbell.

In some embodiments, the method can comprise receiving, by the first remote computing device, a first trait. The first trait can be regarding a first visitor in response to the second user inputting the first trait into the second remote computing device.

In several embodiments, the method of using the doorbell system can comprise taking a second visitor picture, by the first doorbell, and sending the second visitor picture to the doorbell user group. The second remote computing device can display the second visitor picture, even though the second remote computing device may not be communicatively coupled to the first doorbell.

In some embodiments, the doorbell user group can comprise a database having a first visitor picture taken by the second doorbell of the second building. The method can comprise taking, by the first doorbell of the first building, a second visitor picture. The method can comprise determining, by a portion of the doorbell system, that the first visitor picture and the second visitor picture show a visitor.

In several embodiments, the method can comprise labeling the visitor with solicitor information. The members of the doorbell user group can then see the first visitor picture associated with the solicitor information. The method can comprise alerting the members regarding at least a portion of the solicitor information.

In some embodiments, the method can comprise receiving a solicitor alert. The alert can be in response to the second doorbell, of the second building, and the third doorbell, of the third building, detecting a visitor.

In several embodiments, the method can comprise adding solicitation information regarding the visitor to the doorbell user group.

In some embodiments, the method can comprise sending an alert to members of the doorbell user group in response to detecting, by a remote burglar detection system, a burglary of the first building.

In several embodiments, a doorbell system can comprise a first doorbell that can have a first camera that can be coupled to a first building. The first doorbell can be communicatively coupled to a first remote computing device. A second doorbell can have a second camera that can be coupled to a second building. The second doorbell can be communicatively coupled to a second remote computing device. The doorbell system can have a doorbell user group that can comprise a database that can have images taken by the first camera and the second camera. The doorbell user group can be communicatively coupled to the first remote computing device and the second remote computing device.

In some embodiments of the doorbell system, the first doorbell may not be communicatively coupled to the second remote computing device. The second doorbell may not be communicatively coupled to the first remote computing device. The system can be configured such that the first remote computing device can receive a first visitor picture taken by the second doorbell via the doorbell user group.

In several embodiments, the doorbell system can comprise a second visitor picture taken by the first doorbell. The picture can be displayed by the second remote computing device. In some embodiments, the doorbell system can comprise a remote sensor. The remote sensor can be configured to monitor the first building and can detect an unauthorized building intrusion. An alert can be sent to the doorbell user group in response to the remote sensor detecting the unauthorized building intrusion.

In several embodiments, the system can comprise a solicitor alert. A solicitor alert can be sent to the doorbell user group in response to a visitor being detected by the first doorbell, at the first building, and by the second doorbell, at the second building.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
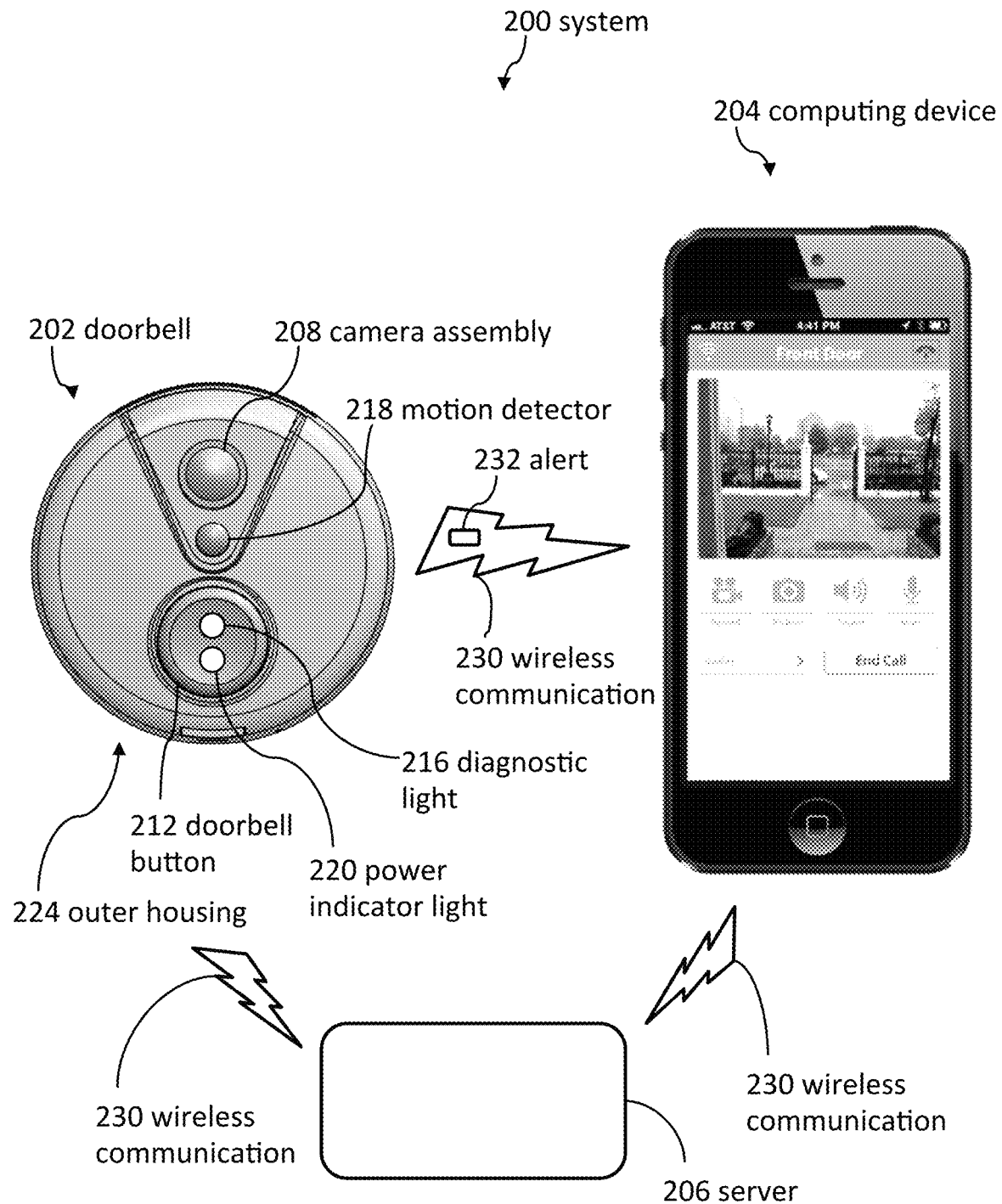
FIG. 1 illustrates a front view of a doorbell system, according to some embodiments.

Referring now to FIG. 1, doorbell systems can be a portion of a smart home hub. In some embodiments, the doorbell system 200 forms the core of the smart home hub. For example, the various systems described herein enable complete home automation. In some embodiments, the doorbell 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the doorbell 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The doorbell system 200 can include a doorbell 202 (e.g., a security system) and a computing device 204. Although the illustrated doorbell 202 includes many components in one housing, several doorbell embodiments include components in separate housings. The doorbell 202 can include a camera assembly 208 and a doorbell button 212. The camera assembly 208 can include a video camera, which in some embodiments is a webcam. The doorbell 202 can include a diagnostic light 216 and a power indicator light 220. In some embodiments, the diagnostic light 216 is a first color (e.g., blue) if the doorbell 202 and/or the doorbell system 200 is connected to a wireless Internet network and is a second color (e.g., red) if the doorbell 202 and/or the doorbell system 200 is not connected to a wireless Internet network. In some embodiments, the power indicator 220 is a first color if the doorbell 202 is connected to a power source. The power source can be supplied by the building to which the doorbell 202 is attached. In some embodiments, the power indicator 220 is a second color or does not emit light if the doorbell 202 is not connected to the power source.

The doorbell 202 can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The doorbell 202 can be electrically coupled to a power source, such as wires electrically connected to a building's electrical power system. In some embodiments, the doorbell 202 includes a battery for backup and/or primary power.

Wireless communication 230 can enable the doorbell 202 to communicate with the computing device 204. Some embodiments enable communication via cellular and/or WiFi networks. Some embodiments enable communication via the Internet. Several embodiments enable wired communication between the doorbell 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the doorbell 202 can initiate voice calls or send text messages to a computing device 204 (e.g., a smartphone, a desktop computer, a tablet computer, a laptop computer).

Several embodiments use near field communication (NFC) to communicate between the computing device 204 and the doorbell 202. The doorbell 202 and/or the computing device 204 can include a NFC tag. Some NFC technologies include Bluetooth, radio-frequency identification, and QR codes.

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
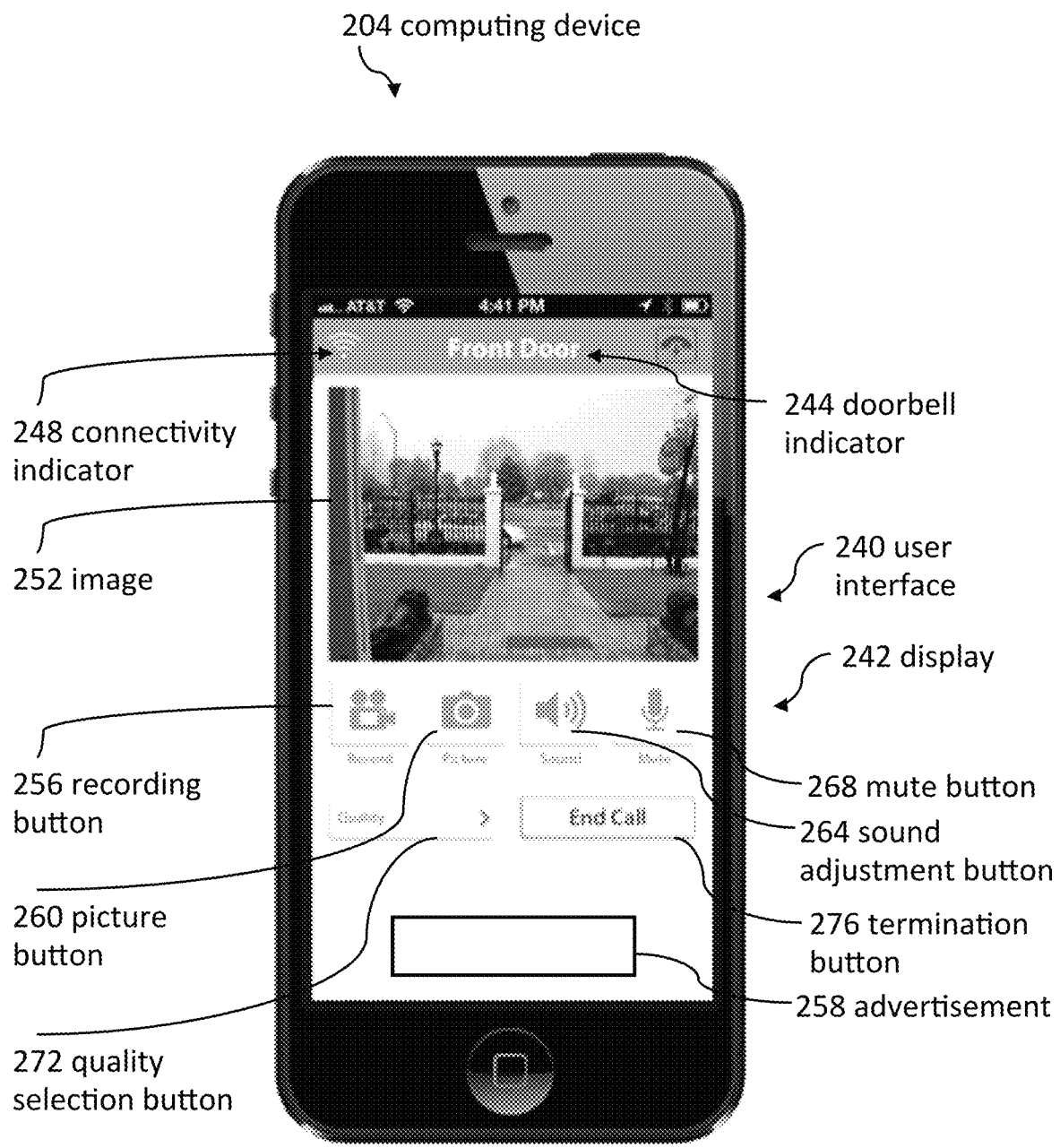
FIG. 2 illustrates a front view of a computing device running software to communicate with the doorbell from FIG. 1, according to some embodiments.

FIG. 2 illustrates a computing device 204 running software. The software includes a user interface 240 displayed on a display screen 242. The user interface 240 can include a doorbell indicator 244, which can indicate the location of the doorbell that the user interface is displaying. For example, a person can use one computing device 204 to control and/or interact with multiple doorbells, such as one doorbell located at a front door and another doorbell located at a back door. Selecting the doorbell indicator 244 can allow the user to choose another doorbell (e.g., the back door's doorbell rather than the front door's doorbell).

The user interface 240 can include a connectivity indicator 248. In some embodiments, the connectivity indicator can indicate whether the computing device is in communication with a doorbell, the Internet, and/or a cellular network. The connectivity indicator 248 can alert the user if the computing device 204 has lost its connection with the doorbell 202; the doorbell 202 has been damaged; the doorbell 202 has been stolen; the doorbell 202 has been removed from its mounting location; the doorbell 202 has lost electrical power; and/or if the computing device 204 cannot communicate with the doorbell 202. In some embodiments, the connectivity indicator 248 alerts the user of the computing device 204 by flashing, emitting a sound, displaying a message, and/or displaying a symbol.

In some embodiments, if the doorbell 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the doorbell 202 and the computing device. In some embodiments, information from the doorbell 202 is stored by the remote server 206. In several embodiments, information from the doorbell 202 is stored by the remote server 206 until the information can be sent to the computing device 204, uploaded to the computing device 204, and/or displayed to the remotely located person via the computing device 204. The remote server 206 can be a computing device that stores information from the doorbell 202 and/or from the computing device 204. In some embodiments, the remote server 206 is located in a data center.

In some embodiments, the computing device 204 and/or the remote server 206 attempts to communicate with the doorbell 202. If the computing device 204 and/or the remote server 206 is unable to communicate with the doorbell 202, the computing device 204 and/or the remote server 206 alerts the remotely located person via the software, phone, text, a displayed message, and/or a website. In some embodiments, the computing device 204 and/or the remote server 206 attempts to communicate with the doorbell 202 periodically; at least every five hours and/or less than every 10 minutes; at least every 24 hours and/or less than every 60 minutes; or at least every hour and/or less than every second.

In some embodiments, the server 206 can initiate communication with the computing device 204 and/or with the doorbell 202. In several embodiments, the server 206 can initiate, control, and/or block communication between the computing device 204 and the doorbell 202. In several embodiments, a user can log in to an "app," website, and/or software on a computing device (e.g., mobile computing device, smartphone, tablet, desktop computer) to adjust the doorbell settings discussed herein.

In some embodiments, a computing device can enable a user to watch live video and/or hear live audio from a doorbell due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the doorbell 202. The image 252 can be taken by the camera assembly 208 and stored by the doorbell 202, server 206, and/or computing device 204. The user interface 240 can include a recording button 256 to enable a user to record images, videos, and/or sound from the camera assembly 208, microphone of the doorbell 202, and/or microphone of the computing device 204.

In several embodiments, the user interface 240 includes a picture button 260 to allow the user to take still pictures and/or videos of the area near and/or in front of the doorbell 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the doorbell 202 to enable the camera assembly 208 to provide sufficient visibility (even at night).

In some embodiments, buttons include diverse means of selecting various options, features, and functions. Buttons can be selected by mouse clicks, keyboard commands, or touching a touch screen. Many embodiments include buttons that can be selected without touch screens.

In some embodiments, the user interface 240 includes a quality selection button, which can allow a user to select the quality and/or amount of the data transmitted from the doorbell 202 to the computing device 204 and/or from the computing device 204 to the doorbell 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the doorbell 202 and the computing device 204. In some embodiments, the termination button 276 ends the ability of the person located near the doorbell 202 (i.e., the visitor) to hear and/or see the user of the computing device 204, but does not end the ability of the user of the computing device 204 to hear and/or see the person located near the doorbell 202.

In some embodiments, a button 276 is both an answer button (to accept a communication request from a visitor) and a termination button (to end communication between the doorbell 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the doorbell and to stop emitting sounds recorded by the doorbell.

In some embodiments, the user interface 240 opens as soon as the doorbell detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a doorbell. The methods can include causing the user interface to display on a remote computing device 204 due to the detection of the visitor (e.g., with or without user interaction). The methods can include displaying video from the doorbell and/or audio from the doorbell before the user accepts two-way communication with the visitor. The methods can include displaying video from the doorbell and/or audio from the doorbell before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the doorbell before opening a means of two-way communication with the visitor.

In some embodiments, the software includes means to start the video feed on demand. For example, a user of the computing device might wonder what is happening near the doorbell 202. The user can open the software application on the computing device 204 and instruct the application to show live video and/or audio from the security device 202 even if no event near the doorbell 202 has triggered the communication.

In several embodiments, the security device 202 can be configured to record when the security device 202 detects movement and/or the presence of a person. The user of the computing device 204 can later review all video and/or audio records from when the security device 202 detected movement and/or the presence of a person.

Referring now to FIG. 1, in some embodiments, the server 206 controls communication between the computing device 204 and the doorbell 202, which can be a doorbell with a camera, a microphone, and a speaker. In several embodiments, the server 206 does not control communication between the computing device 204 and the doorbell 202.

In some embodiments, data captured by the doorbell and/or the computing device 204 (such as videos, pictures, and audio) is stored by another remote device such as the server 206. Cloud storage, enterprise storage, and/or networked enterprise storage can be used to store video, pictures, and/or audio from the doorbell system 200 or from any part of the doorbell system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the doorbell 202 can store information and statistics regarding visitors and usage.

Figure 3:
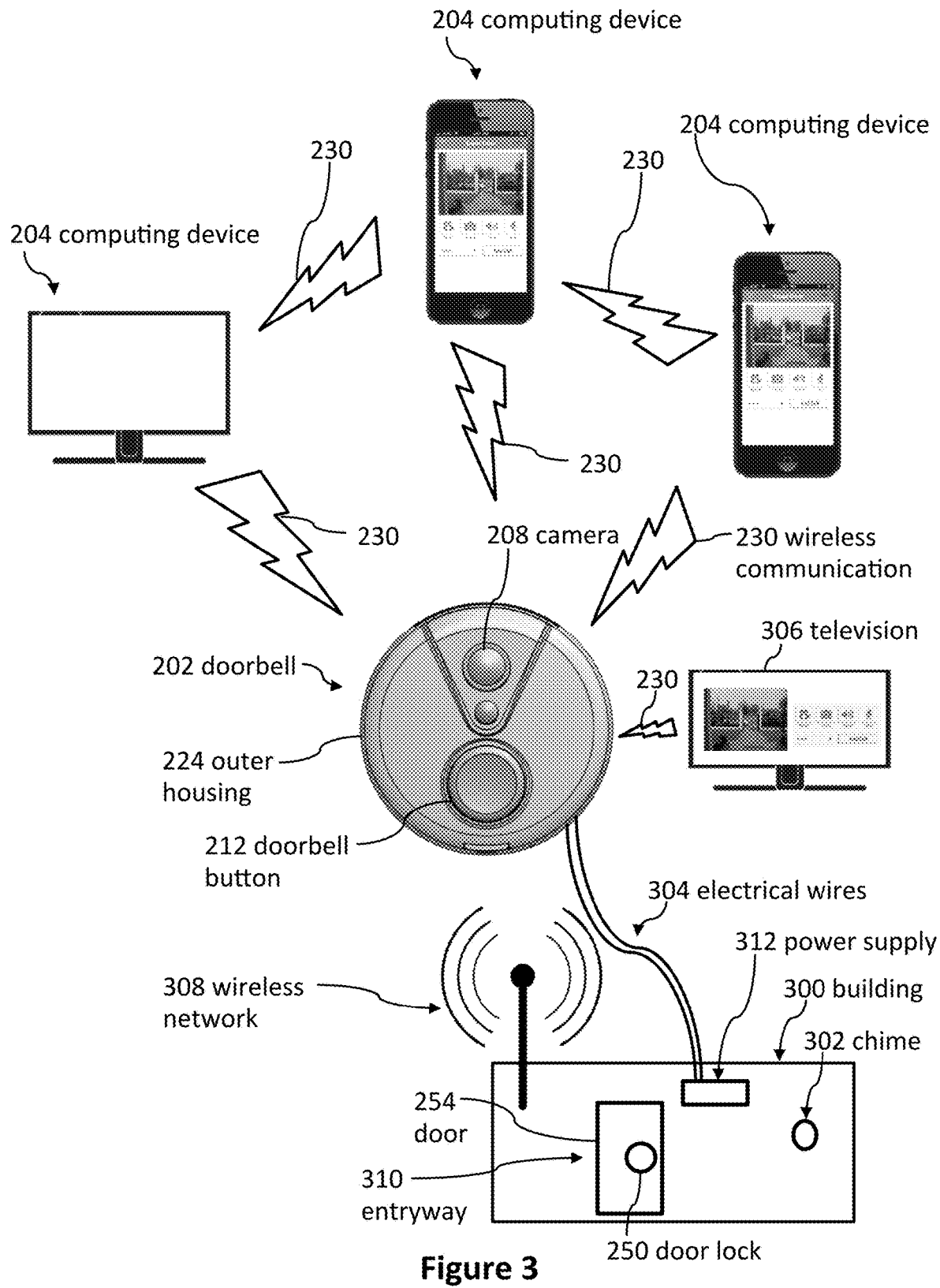
FIG. 3 illustrates a diagrammatic view of an embodiment in which the doorbell from FIG. 1 is connected to a building, according to some embodiments.

FIG. 3 illustrates an embodiment in which a doorbell 202 is connected to a building 300, which can include an entryway 310 that has a door 254. Electrical wires 304 can electrically couple the doorbell 202 to the electrical system of the building 300 such that the doorbell 202 can receive electrical power from the building 300. The building can include a door lock 250 to lock the door 254.

A wireless network 308 can allow devices to wirelessly access the Internet. The doorbell 202 can access the Internet via the wireless network 308. The wireless network 308 can transmit data from the doorbell 202 to the Internet, which can transmit the data to remotely located computing devices 204. The Internet and wireless networks can transmit data from remotely located computing devices 204 to the doorbell 202. In some embodiments, a doorbell 202 connects to a home's WiFi.

As illustrated in FIG. 3, one computing device 204 (e.g., a laptop, a smartphone, a mobile computing device, a television) can communicate with multiple doorbells 202. In some embodiments, multiple computing devices 204 can communicate with one doorbell 202.

In some embodiments, the doorbell 202 can communicate (e.g., wirelessly 230) with a television 306, which can be a smart television. Users can view the television 306 to see a visitor and/or talk with the visitor.

Figure 4:
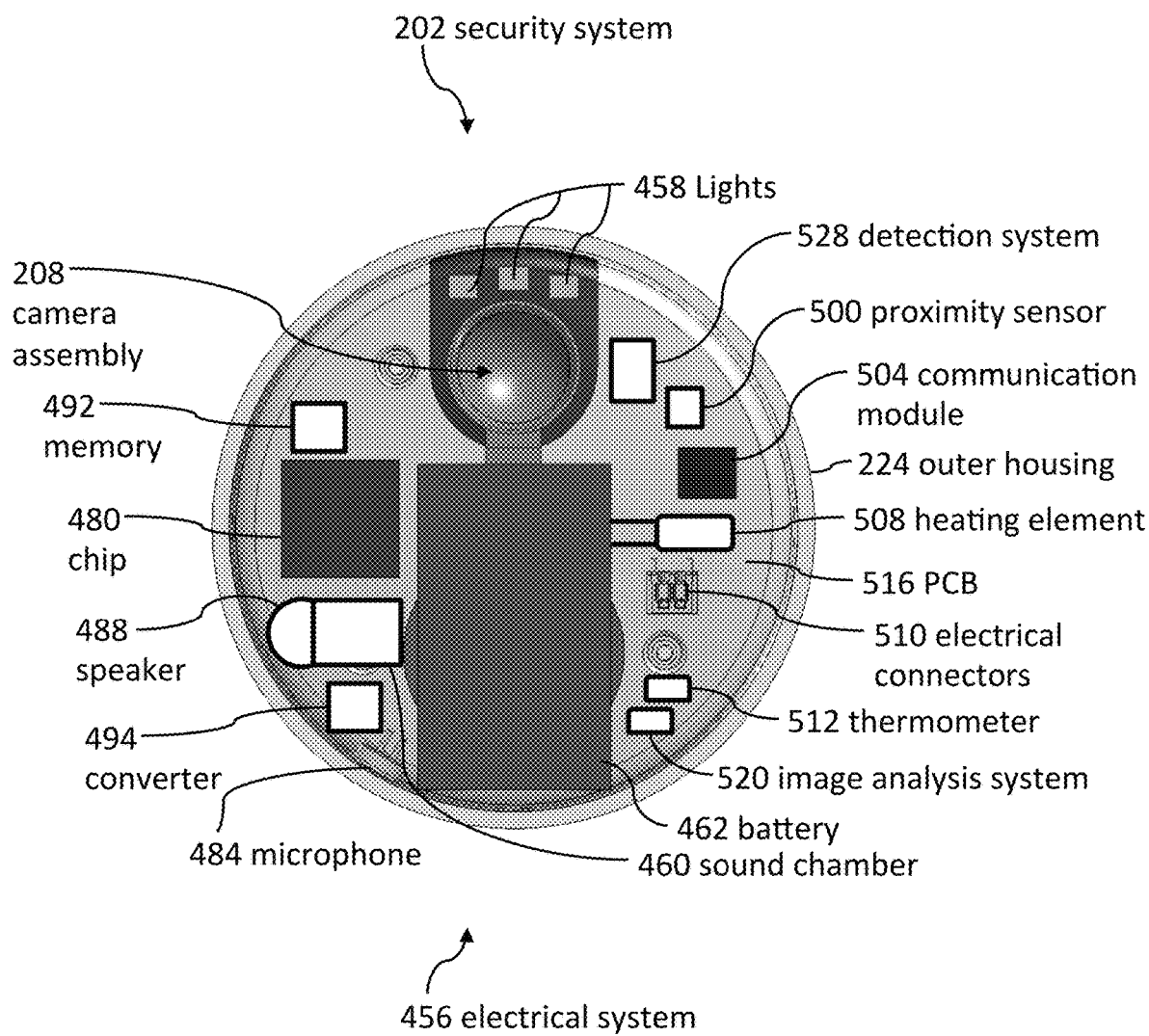
FIG. 4 illustrates a back view of the doorbell from FIG. 1 without a mounting bracket, according to some embodiments.

FIG. 4 illustrates an internal view of the doorbell 202. Doorbells 202 can include a chip 480 (e.g., integrated circuits, microprocessor, computer) and a memory 492. Doorbells 202 can also include a microphone 484 and a speaker 488. The speaker 488 can comprise a flat speaker and a sound chamber 460 configured to amplify an emitted sound. The flat speaker can be located in the sound chamber. Some doorbell embodiments include a proximity sensor 500. In several embodiments, doorbells 202 include a wireless communication module 504, such as a WiFi module. The communication module 504 can have an integrated antenna. In some embodiments, an antenna is contained within the outer housing 224.

The doorbell 202 can include one or more heating elements 508 configured to regulate the temperature of the doorbell 202. For example, doorbells 202 can be used in very cold environments, such as in Alaska. The heating element 508 can be used in various methods to protect temperature sensitive portions of the doorbell 202 from cold weather.

While protecting the doorbell 202 from cold weather can be important in some embodiments, protecting visitors from excessive heat can also be important in some embodiments. Excessive heat could burn visitors as they "ring" the doorbell (e.g., press the doorbell button 212 shown in FIG. 10). The doorbell 202 can include a thermometer 512 to enable the system to determine the temperature inside a portion of the doorbell 202 and/or outside the doorbell 202.

Several embodiments can be configured for 9 to 40 volts alternating current ("VAC") and/or 9 to 40 volts direct current ("VDC"). Some embodiments convert input electricity into direct current (DC), such as 12 VDC. Several embodiments include a converter 494 for power conversion (e.g., converting electrical energy from one form to another). The converter 494 can convert input power (e.g., from wiring in a building) to a suitable power form for the doorbell 202. The power conversion can convert between AC and DC, change the voltage, and/or change the frequency. The converter 494 can include a transformer and/or a voltage regulator. In several embodiments, the converter 494 can include an AC to DC converter, a DC to DC converter, a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

The electrical components of the doorbell 202 (e.g., the camera assembly 208, the memory 492, the chip 480, the speaker 488, the converter 494, the microphone 484, the lights 458, the rectifier 524, the proximity sensor 500, the communication module 504, the heating element 508, the electrical connectors 510, the thermometer 512, the image analysis system 520, and the battery 642) can be electrically coupled to a printed circuit board ("PCB") 516 and can receive electrical power from the PCB 516.

The PCB 516 and the electrical components of the doorbell 202 can be the electrical system 456 of the doorbell 202. Additional details regarding the PCB 516 and the electrical components of the doorbell 202 are described in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

Although some embodiments are described in the context of methods, the method embodiments can also be formulated as devices and systems. Methods described herein can be applied to the devices and systems incorporated by references herein.

Systems with Multiple Doorbells

Multiple doorbells can share data to "watch" over a neighborhood by letting people connect with neighbors and share information regarding suspicious visitors. The shared information can include pictures of visitors and the time of suspicious activity. As a result, sharing data between multiple doorbell users can help reduce crime and theft in neighborhoods around the world.

Suspicious activity can be "tagged" and shared with members of a user group (e.g., a group of neighbors). The shared data can include photos and information regarding suspicious visitors. The information can include written descriptions, recorded descriptions, and videos. For example, a first doorbell can take a picture of a visitor. The doorbell can send the picture to a remote computing device. A user of the remote computing device can see the visitor. Then, the user can enter information regarding the suspicious visitor into the remote computing device. The doorbell system can then share the information and the picture of the visitor with a user group, which can include other doorbell users.

An administrator of the user group can be a "master user" who has the ability to add other users to the user group. One way of adding users to a user group is to enter email addresses of prospective users into a remote computing device (e.g., into an "app" running on the remote computing device). This app can be the same app used by the administrator to configure her doorbell.

In a user group section (e.g., a "neighborhood section") of the app, a user can see who else is in her neighborhood. In some embodiments, the home locations of prospective or current users are displayed on a map. Selecting prospective users can enable the administrator to add new users to the user group.

When a user thinks a visitor is suspicious, the user can report the visitor and the nature of the suspicious activity to the user group. Thus, the user can enter the visitor into an activity log such that the event has a "suspicious" tag. The event can then be shared with the other users via email, text message, a push notifications, or any suitable means. The event can be recorded in a user group activity list, which in some embodiments, is only visible to members of the user group (or at least is not visible to the general public). The event can also be listed in a history of events reported by a specific individual. Thus, users can see events they reported, and users can see events reported by all members of a user group.

Each event can include an icon. Selecting the icon can cause the event to be shared with the user group. In some embodiments, icons are shown on a map that is displayed on a remote computing device. In this manner, users can see where suspicious visitors have been reported by members of the user group, and in some embodiments, by members of other user groups.

In some embodiments, a user group is limited to a particular neighborhood. In other embodiments, user groups are not limited to a particular neighborhood.

Visitor data from a user (or from a user group) can be shared with law enforcement (e.g., police officers) or other safety personnel to help keep neighborhoods safe. A suspicious event reported by a first user can be shared with a second user. The second user can then share the event with law enforcement. In some embodiments, the user who reports the event to the user group also reports the event to law enforcement (e.g., by selecting a button in the app).

The app can include a "distress button" configured to enable a user to alert law enforcement and user group members that something is wrong. Pressing the button on a remote computing device can cause a doorbell system to send a push notification to other users to notify them that help is needed. The push notification can also communicate the nature of the event and can enable users to see a picture of the visitor causing the trouble.

Figure 5:
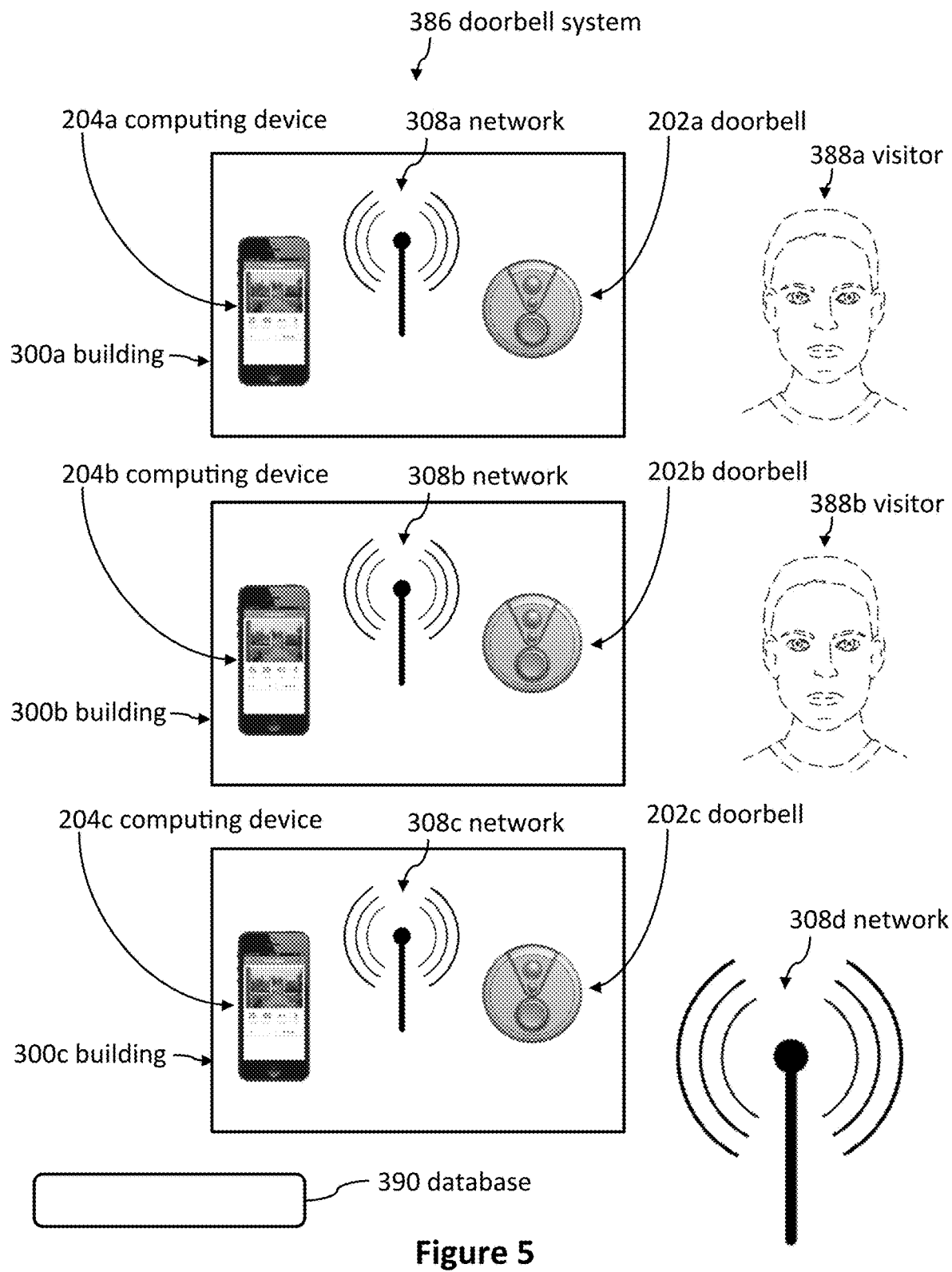
FIG. 5 illustrates a diagrammatic view of a group of doorbells, according to some embodiments.

FIG. 5 illustrates a neighborhood, which can include many buildings 300a, 300b, 300c. The buildings 300a, 300b, 300c can be individual homes or individual buildings (e.g., multiple single-family homes, multiple apartments coupled together, offices). The buildings 300a, 300b, 300c can be located next to each other or they can be separated by other homes or buildings. Embodiments can include diverse ways of using a doorbell system 386, which can include multiple doorbells 202a, 202b, 202c and multiple remote computing devices 204a, 204b, 204c. Each doorbell 202a, 202b, 202c can be coupled to an exterior wall of a different building 300a, 300b, 300c. A different remote computing device 204a, 204b, 204c can configure each doorbell 202a, 202b, 202c. Each building 300a, 300b, 300c can have its own wireless network 308a, 308b, 308c. Another network 308d (e.g., a cellular network, the Internet) can enable a first doorbell 202a to send a picture of a visitor 388a to a second doorbell 202b and/or to a second remote computing device 204b.

A first doorbell 202a can send a visitor notification (e.g., an alert as shown in FIG. 1) to a first computing device 204a via a first wireless network 308a. In some embodiments, however, it is advantageous for a doorbell 202a or a remote computing device 204a associated with a first building 300a to send information regarding a visitor 388a to a doorbell 202b or a remote computing device 204b associated with a second building 300b. In several embodiments, it is advantageous for a doorbell 202a or a remote computing device 204a associated with a first building 300a to receive information regarding a visitor 388b from a doorbell 202b or a remote computing device 204b associated with a second building 300b. An external network 308d can facilitate this sending and receiving of information regarding visitors 388a, 388b. This way, the doorbell system 386 can enable notifying a second remote computing device 204b regarding a visitor detected by a first doorbell 202a even though the second remote computing device 204b is not configured to control the first doorbell 202a.

Each of the doorbells 202a, 202b, 202c illustrated in FIG. 5 can include a camera assembly 208 (as labeled in FIG. 1). Some embodiments of using the doorbell system 386 include taking a first picture of a first visitor 388a with the first doorbell 202a; sending the first picture to the first remote computing device 204a; and indicating a first trait (e.g., identity, suspicious behavior, bodily characteristics) of the first visitor 388a via the first remote computing device 204a.

The first remote computing device 204a can be used to categorize the visitor. For example, the user of the first remote computing device can indicate whether the first visitor 388a is a salesperson, a fundraiser, or a potential criminal. The first remote computing device 204a can share this categorization with other members of the user group, which can include users of the remote computing devices 204a, 204b, 204c.

A first user of the first remote computing device 204a (e.g., the owner of the first doorbell 202a) can create a user group. The user group can include the first user of the first remote computing device 204a and a second user of a second remote computing device 204b. Note that in FIG. 5, the first remote computing device 204a is located remotely relative to the first doorbell 202a because the first remote computing device is not electrically or mechanically coupled to the first doorbell 202a (even though the first remote computing device 204a and the first doorbell 202a are located in the same building 300a).

Embodiments can also include sharing the first picture of the first visitor 388a with the user group. The sharing of the first picture of the first visitor 388a with the user group can be in response to the first trait of the first visitor 388a. For example, the first trait can be that the first visitor 388a is acting suspiciously by peaking over fences or looking through windows. Several embodiments include sending the first trait and the first picture of the first visitor 388a to a database 390 configured to provide information regarding the first visitor 388a to the user group. The first doorbell 202a can also determine a time at which the first visitor 388a visited the first doorbell 202a. A portion of the doorbell system 386 can provide this time to the database 390.

Some embodiments include receiving data with the first remote computing device 204a regarding a second doorbell 202b that comprises a second camera and regarding a third doorbell 202c that comprises a third camera. As illustrated in FIG. 5, the first doorbell 202a is coupled to a first building 300a. The second doorbell 202b is coupled to a second building 300b. The third doorbell 202c is coupled to a third building 300c. Doorbells can be mounted near a door in an entryway. The buildings 300a, 300b, and 300c can be located apart from each other such that each building is a separate residential dwelling or a separate office space. The database 390 can be configured to share visitor information with the user group. Embodiments can include selecting (via the first remote computing device 204a) to receive the visitor information from at least one of the second doorbell 202b and the third doorbell 202c. Receiving the data can comprise receiving the visitor information from a different location than a first location of the first building 300a.

Each doorbell 202a, 202b, and 202c can include a camera assembly 208 (labeled in FIG. 1). In several embodiments, a camera assembly 208 can take videos or stationary images. Thus, a "picture" taken by a camera of a doorbell can actually be a video. In some embodiments, the "picture" is a stationary image (rather than a video).

There are many ways to create user groups. In some embodiments, creating a user group comprises adding a first email address and a second email address to a database. The first email address can be associated with the first doorbell 202a. The second email address can be associated with a second doorbell 202b. In some embodiments, a first user of a first doorbell 202a sends an invitation to join a doorbell user group to a second user of a second doorbell 202b. The first user can send the invitation via a first remote computing device 204a (that is authorized to configure the first doorbell 202a) to a second remote computing device 204b (that is authorized to configure the second doorbell 202b). The second user can then accept or decline the invitation via the second remote computing device 204b. In some embodiments, the second user accepts or declines the invitation to join the doorbell user group at least partially in response to seeing the location of the first doorbell 202a on the display of the second computing device 204b. For example, if the first and second users are neighbors, then the second user could be more likely to accept the invitation than if the first and second users live much farther away from each other.

Figure 6:
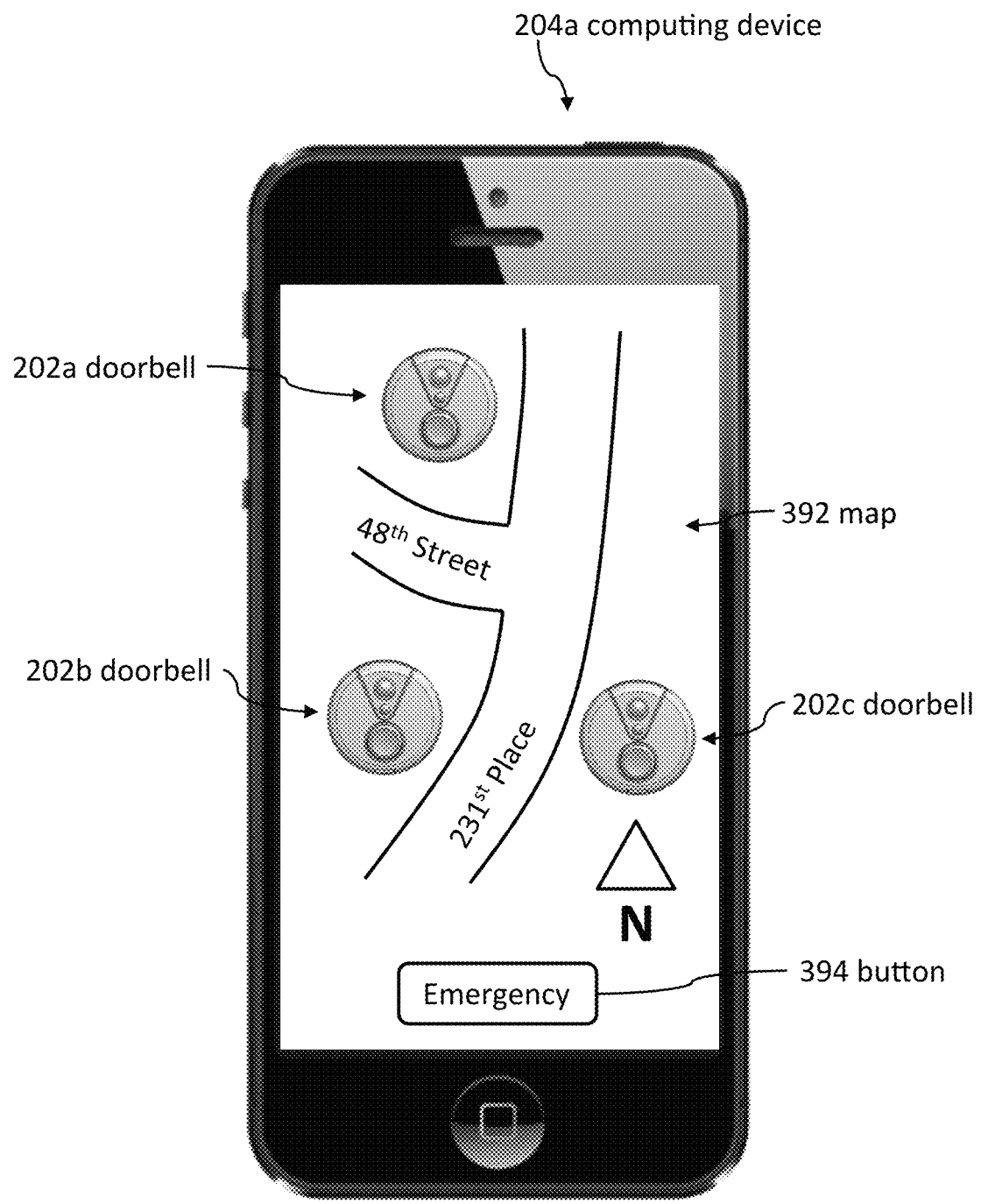
FIG. 6 illustrates a front view of a remote computing device displaying a map, according to some embodiments.

FIG. 6 illustrates a map 392 that is displayed by the first remote computing device 204a. The map 392 displays a first location of the first doorbell 202a, a second location of the second doorbell 202b, and a third location of the third doorbell 202c. The map 392 can also include other items such as street names. Several embodiments include displaying information regarding the second doorbell 202b in response to a person using the first computing device 204a to select a second icon representing the second doorbell 202b while the second icon is displayed on the first remote computing device 204a. (In FIG. 6, doorbells 202a, 202b, 202c are represented by icons that look like doorbells.) This information can include an address of the second doorbell 202b, contact information (e.g., a name, a phone number, an email) of a user of the second doorbell 202b, and/or a picture of the user of the second doorbell 202b. Selecting the second icon can add a second user of the second doorbell 202b to the doorbell user group. Not all members of a doorbell user group necessarily have a doorbell. Members of the user group who have not yet purchased a doorbell with a camera can still receive visitor information, including visitor pictures, on their remote computing devices. For example, a picture taken by the first doorbell 202a can be sent to the remote computing devices of people who have not purchased a doorbell with a camera.

Several embodiments include selecting a first button 394 on the display of the first remote computing device 204a to alert law enforcement and/or to alert the user group. The button 394 can be a portion of the graphical user interface of an app.

A first user can also join a user group that was previously created by another user. This first user can couple a first doorbell having a first camera to a first building; configure the first doorbell to wirelessly communicate with a first remote computing device; and/or join a user group via the first remote computing device. This user group can comprise a second user of a second doorbell having a second camera and a third user of a third doorbell having a third camera. The second doorbell can be configured to wirelessly communicate with a second remote computing device. This first user can receive a first picture and a first trait of a first visitor with the first remote computing device. This first picture could have been taken previously by the second doorbell or the third doorbell. This first user can take a second picture of a second visitor with the first doorbell; and/or send the second picture of the second visitor to the user group such that the second remote computing device can display the second picture. This first user can detect a second visitor with the first doorbell. This first user can determine that the second visitor is the first visitor by a portion of the doorbell system analyzing the first picture from the second doorbell or the third doorbell. This analysis can include the doorbell system comparing the first picture to the second picture. Embodiments can also include alerting a first user of the first doorbell that the second visitor is the first visitor (i.e., the first visitor is the same person as the second visitor).

Figure 7:
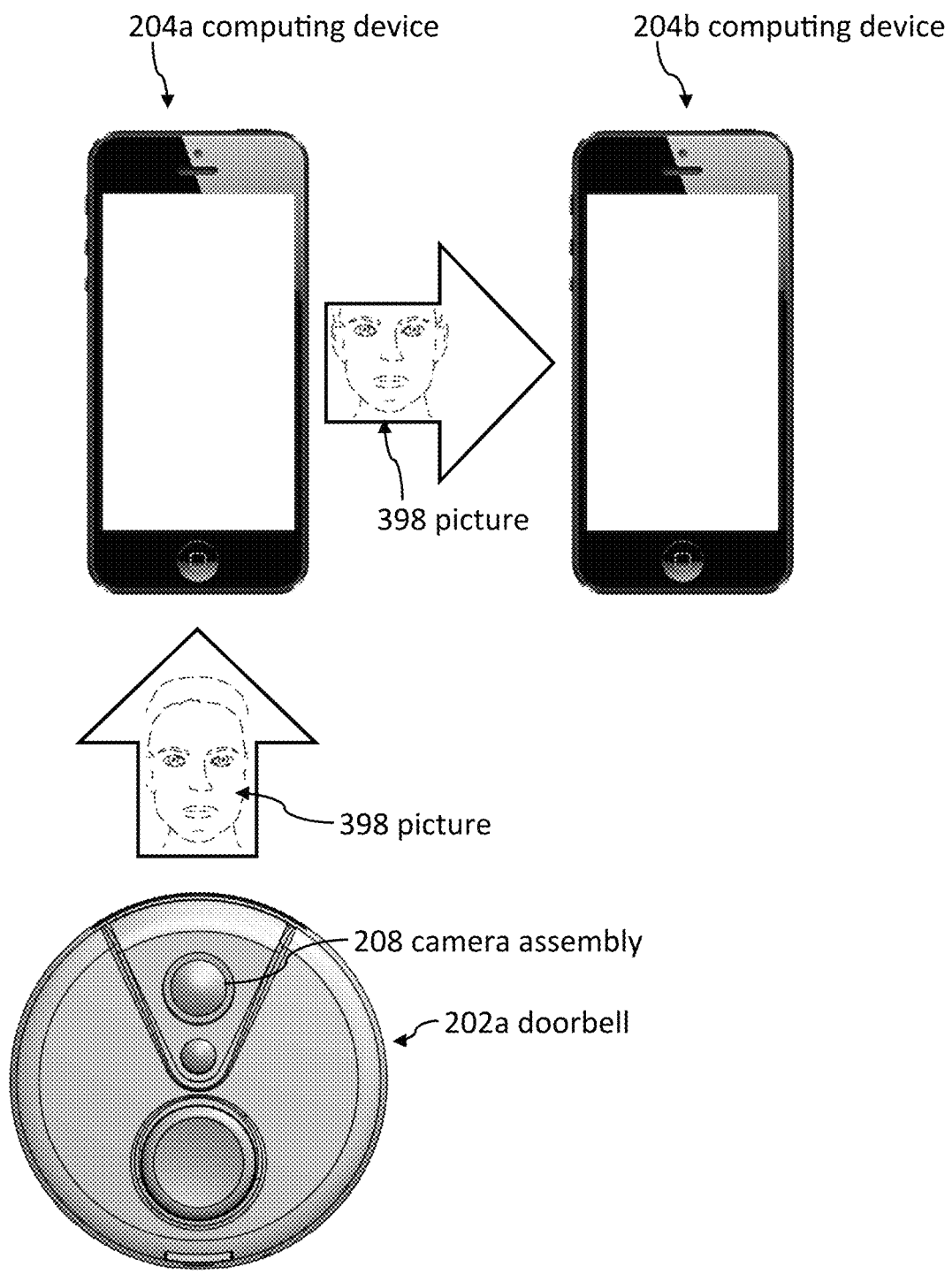
FIG. 7 illustrates a diagrammatic view of picture being communicated, according to some embodiments.

FIG. 7 illustrates that a first doorbell 202a can take a picture 398. Then, the first doorbell 202a can send the picture 398 to a first remote computing device 204a. (The doorbell 202a can send the picture 398 directly to the first remote computing device 204a or indirectly to the first remote computing device 204a via an intermediary device such as a router, server, network, and/or the Internet.) Then, the first remote computing device 204a can send the picture 398 to a second remote computing device 204b. This approach enables the second remote computing device 204b to receive the picture 398 even though the second remote computing device is not communicatively coupled to the doorbell 202a.

Figure 8:
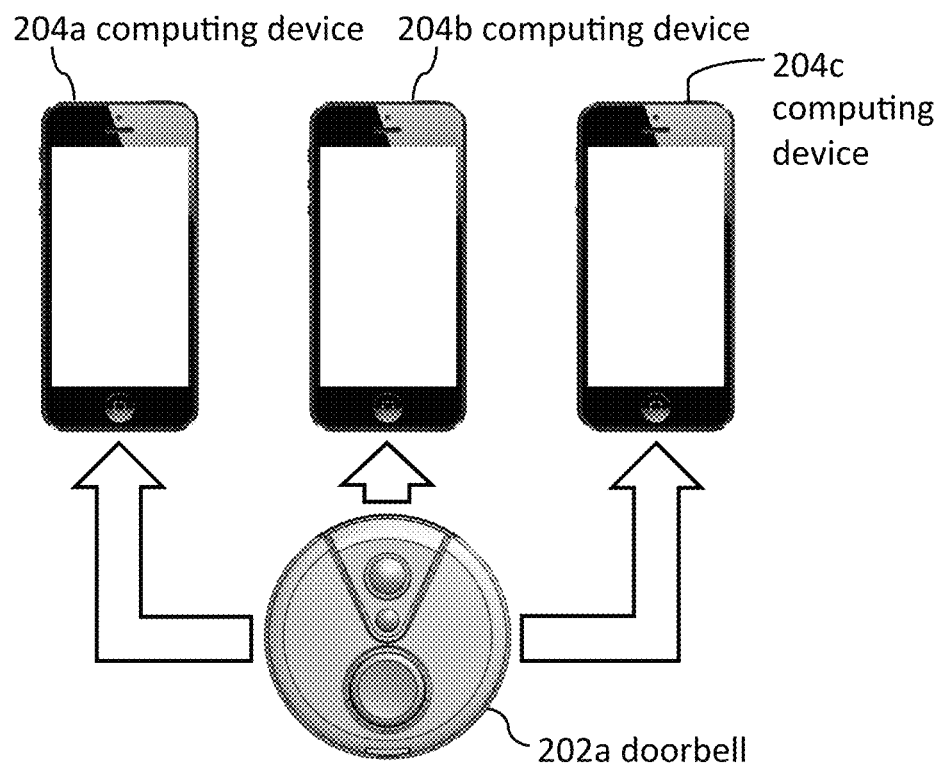
FIG. 8 illustrates a diagrammatic view of a doorbell that is communicatively coupled to multiple remote computing devices, according to some embodiments.

In contrast, FIG. 8 illustrates an embodiment in which multiple remote computing devices 204a, 204b, 204c are communicatively coupled with one doorbell 202a. Thus, the doorbell 202a can send a picture that it takes to all of the remote computing devices 204a, 204b, 204c. In some cases, a first user might not want her doorbell to be communicatively coupled with a neighbor's remote computing device (e.g., because communicatively coupling her doorbell with her neighbor's remote computing device could enable the neighbor to see visitors and/or talk with visitors to the home of the first user without the first user's permission). As a result, the first user might want to be able to share a visitor picture and/or visitor information with a neighbor without the neighbor's remote computing device being communicatively coupled with the first user's doorbell. The first user's remote computing device, a user group, a server and/or a database can act as a gatekeeper that enables the first user to control what visitor information she shares with other members of a user group (e.g., with neighbors or members of other households).

In some embodiments, a homeowner can share information from her doorbell with neighbors' remote computing devices via the doorbell user group 400 (shown in FIG. 10) even though the neighbors' remote computing devices are not configured to receive visitor alerts from the homeowner's doorbell each time the homeowner's doorbell detects a visitor (e.g., via motion detection or button press detection). Some embodiments include the homeowner (e.g., a user) choosing to send a first visit information (regarding a first visitor) to neighbor's remote computing devices and choosing not to send a second visit information (regarding a second visitor) to neighbor's remote computing devices. This choosing step can be after and in response to seeing (e.g., displaying) the visitors on a remote computing device. Thus, the system 408 (shown in FIG. 10) enables a user to selectively decide what visit information to share with members of the doorbell user group.

In contrast, the configuration illustrated in FIG. 8 does not enable selectively deciding what visit information to share. Instead, all the remote computing devices 204a, 204b, 204c receive the visit information. While the configuration illustrated in FIG. 8 may work well for one household, it typically does not work well with multiple households (e.g., an entire neighborhood) due to privacy concerns and due to the fact that most neighbors would not want to receive a notification every time a person approaches any home in the neighborhood. The number of unhelpful notifications would be very bothersome. Imagine how many uneventful notifications a user would receive each day after school as dozens of children come home. Thus, the system 408 illustrated in FIG. 10 works much better than the system illustrated in FIG. 8 when multiple households, homes, and/or buildings are involved in the visitor information sharing.

Figure 11:
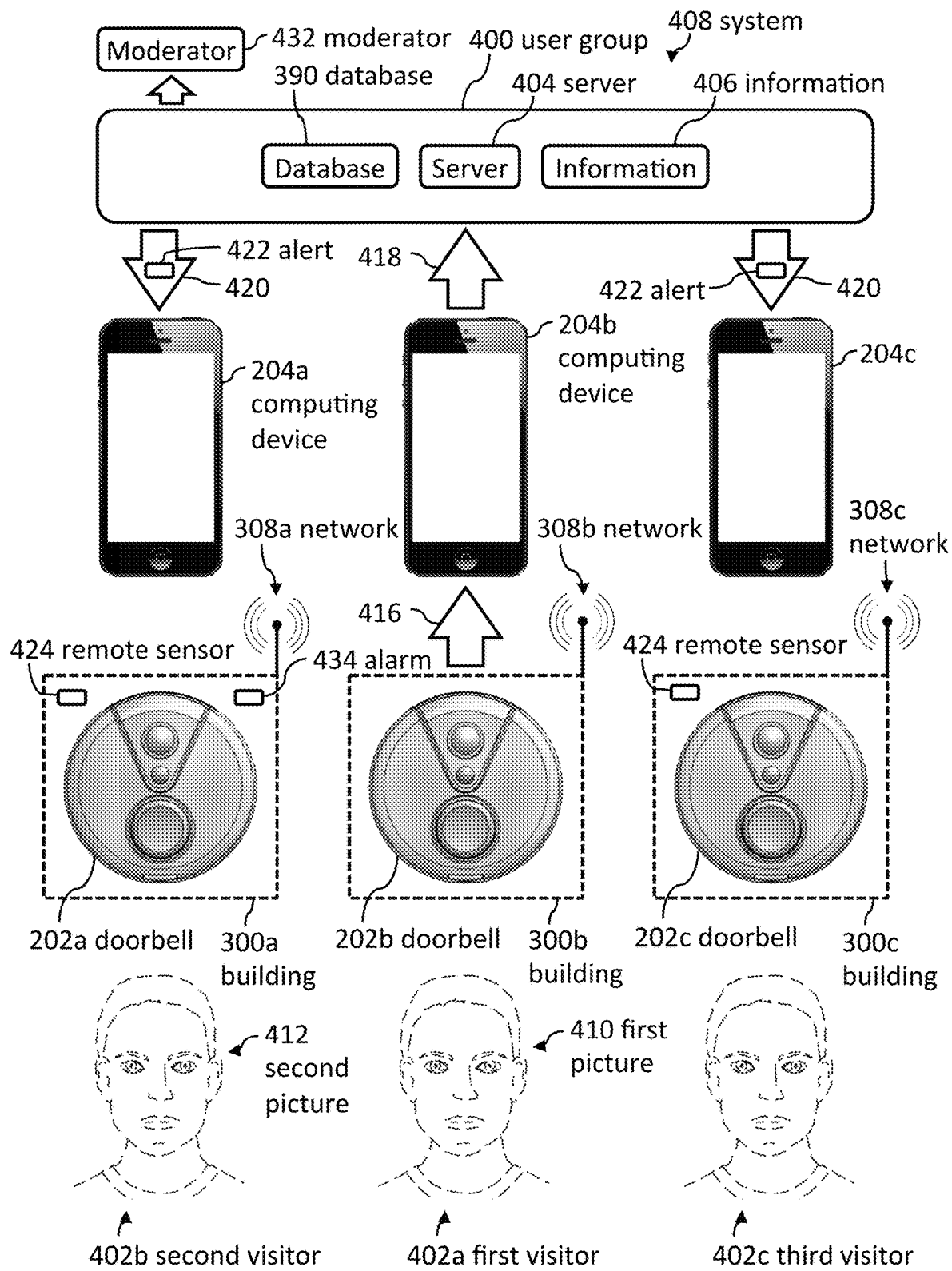

For example, as shown in FIG. 11, the remote computing device 204b and/or the user group 400 can act as a gatekeeper system to enable a user to select which visitor information is shared other remote computing devices 204a, 204c after the user's remote computing device 204b receives the visitor information. This approach allows a user to share (e.g., by selecting a button on the device 204b) information regarding some visitors (e.g., suspicious visitors) with other remote computing devices 204a, 204c after seeing (or displaying) the visitors on the computing device 204b. This approach also allows the user to not share information regarding other visitors (e.g., trusted friends) with other remote computing devices 204a, 204c after seeing (or displaying) the other visitors on the computing device 204b. Thus, the "share decision" can be in response to the user seeing (e.g., analyzing) the visitors on her remote computing device 204b.

In contrast, the system shown in FIG. 8 does not include a visitor by visitor "share decision." Instead, a user simply adds several computing devices 204a, 204b, 204c to a system such that the computing devices 204a, 204b, 204c receive a visitor notification (e.g., an alert) each time the doorbell 202a detects a visitor in response to the computing devices 204a, 204b, 204c being communicatively coupled with the doorbell 202a.

Figure 9:
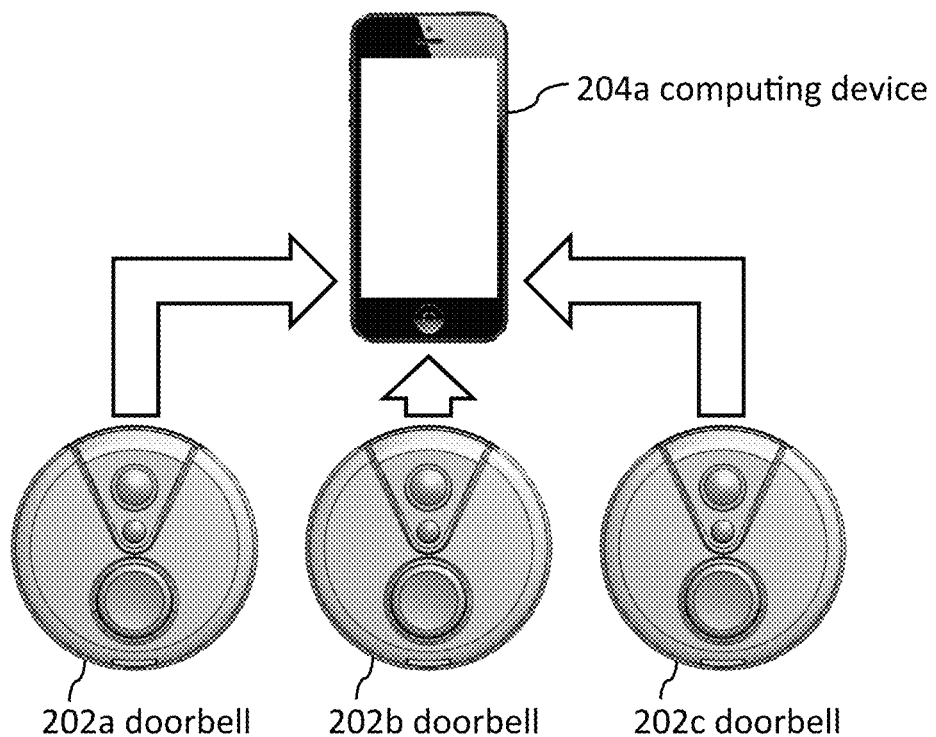
FIG. 9 illustrates a diagrammatic view of a remote computing device that is communicatively coupled to multiple doorbells, according to some embodiments.
Figure 10:
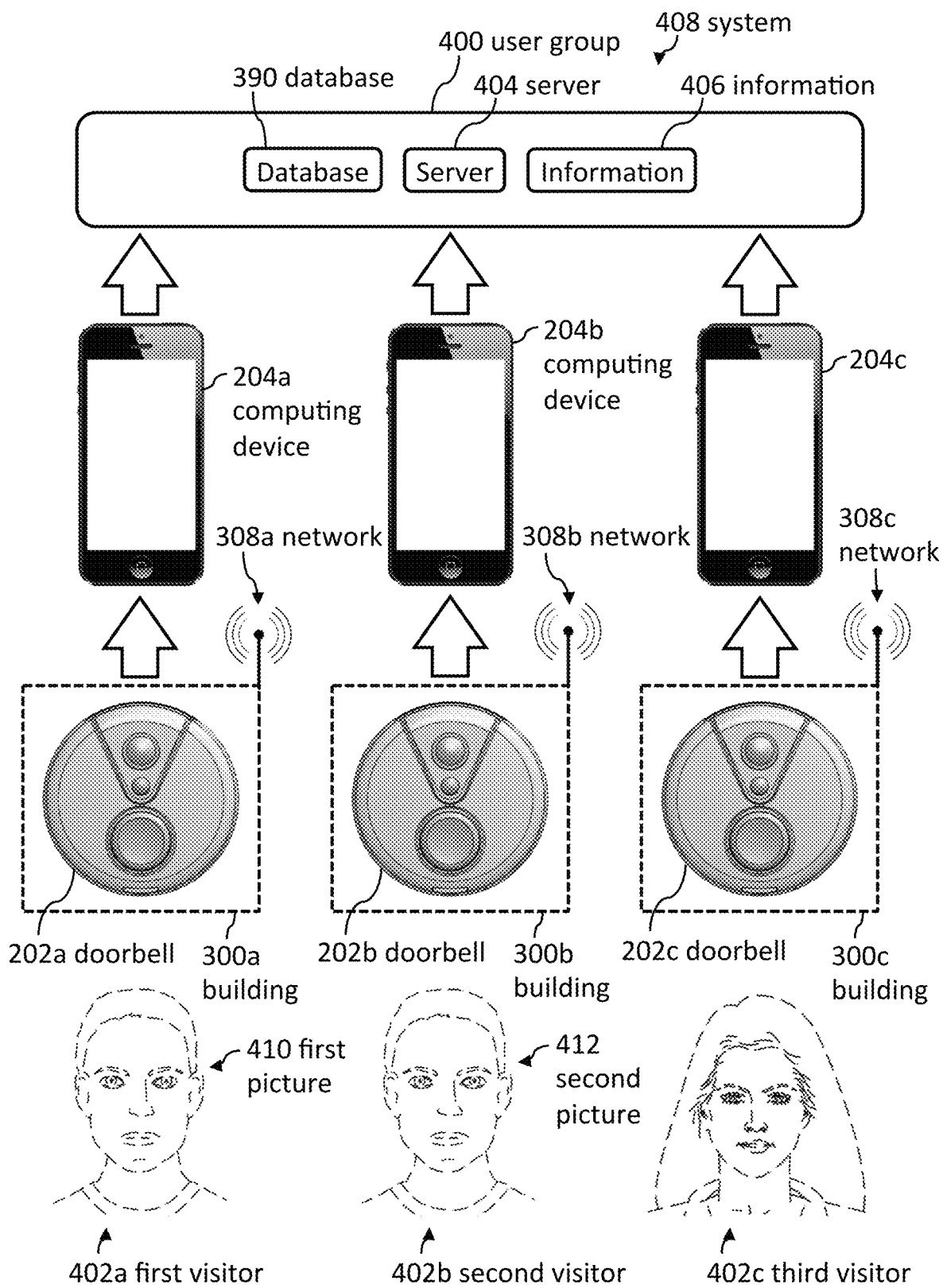
FIGS. 10 and 11 illustrate diagrammatic views of doorbell user groups, according to some embodiments.

FIG. 9 illustrates an embodiment in which a remote computing device 204a is communicatively coupled (e.g., wirelessly) with multiple doorbells 202a, 202b, 202c. For example, a first user could be able to see and/or talk with visitors detected by her own doorbell 202a or detected by neighbors' doorbells 202b, 202c. This approach raises privacy concerns. FIG. 10 illustrates a diagrammatic view of an embodiment that includes a user group 400. The user group 400 can include a database 390, a server 404, and user information 406 such as email addresses, user profiles, and user doorbell locations.

Thus, many embodiments enable members of a user group to share visitor information with each other without granting doorbell control to members of the user group. For example, a first user can alter at least one setting (e.g., a chime tone, a greeting, a silent mode, on-demand video modes) of her doorbell but typically cannot alter settings of neighbors' doorbells (e.g., of other doorbells in the user group). These embodiments enable a first user to determine what visitor pictures and information her doorbell shares with a user group.

The doorbell system 408 can include a first remote computing device 204a communicatively coupled to a first doorbell 202a that has a first camera 208 (labeled in FIG. 1). Some embodiments include sending a first picture 410, taken by the first doorbell 202a, of a first visitor 402a to the first remote computing device 204a. An arrow indicates the first doorbell 202a is communicatively coupled with the first remote computing device 204a. This communicatively coupling can be wireless and can include two-way communication to enable the first remote computing device 204a to send data and doorbell setting parameters to the first doorbell 202a.

The first doorbell 202a is not communicatively coupled to the second remote computing device 204b even though the second remote computing device 204b can receive a picture taken by the first doorbell 202a from at least a portion of the user group 400. This way, the second remote computing device 204b can receive information regarding a visitor detected by the first doorbell 202a, but the second remote computing device 204b cannot alter settings of the first doorbell 202a, initiate on-demand videos from the first doorbell 202a, or talk with the first visitor 402a via the first doorbell 202a.

Embodiments can include creating a doorbell user group 400 comprising a first user of the first remote computing device 204a and a second user of the second remote computing device 204b, which is communicatively coupled to a second doorbell 202b (as shown by the arrow) but is not communicatively coupled to the first doorbell 202a. The remote computing devices 204a, 204b, 204c can be communicatively coupled with the user group 400 to enable sharing visitor information (e.g., pictures, audio files, visitor descriptions) detected by one of the doorbells 202a, 202b, 202c (and/or recorded by one of the remote computing devices 204a, 204b, 204c) with all of the remote computing devices 204a, 204b, 204c communicatively coupled with the user group 400. This way, visitor information can be shared with members of the user group 400 without users being concerned that other members of the user group 400 might hear private visitor conversations and/or see confidential visitors. Embodiments can enable a user to control what visitor information members of the user group receive from the user's doorbell.

Embodiments can include sharing the first picture 410 of the first visitor 402a with the doorbell user group 400 such that the second remote computing device 204b receives the first picture 410 taken by the first doorbell 202a. Sharing the first picture 410 with the doorbell user group 400 can require the user of the first remote computing device 204a to authorize sharing the first picture (and/or other information regarding the first visitor 402a) with the user group 400. As illustrated in FIG. 10, the first remote computing device 204a is not communicatively coupled to the second doorbell 202b. Embodiments can include receiving, by the first remote computing device 204a, a second picture 412 taken by the second doorbell 202b in response to the second doorbell 202b sending the second picture 412 to a database 390 configured to provide visitor information 406 to the doorbell user group 400.

The visitors 402a, 402b, 402c can be the same person. For example, a solicitor knocking on doors of buildings 300a, 300b, 300c in a neighborhood can be detected by motion sensors of many doorbells 202a, 202b, 202c. In some cases, visitors 402b, 402c can be different people. FIG. 11 illustrates a diagrammatic view of an embodiment that includes a user group 400. Using a doorbell system 408 can include coupling a first doorbell 202a having a first camera 208 (labeled in FIG. 1) to a first building 300a. The first building 300a can include a first wireless network 308a that communicatively couples the first doorbell 202a to the first remote computing device 204a, but does not communicatively couple the first doorbell 202a to a second remote computing device 204b.

In some embodiments, the doorbell 202a is connected to the first wireless 308a, which connects to the Internet and/or to a cellular network to enable the first doorbell 202a to be communicatively coupled to the first remote computing device 204a even when the first remote computing device 204a is many miles away from the first building 300a. In some cases, when the first remote computing device 204a is located within range of the first wireless network 308a (e.g., inside the first building 300a), the first wireless network 308a can directly communicatively couple the first doorbell 202a to the first remote computing device 204b. The second building 300b can include a second wireless network 308b, which can communicatively couple the second doorbell 202b to the second remote computing device 204b. The third building 300c, to which the third doorbell 202c can be mechanically coupled, can include a third wireless network 308c.

Several embodiments include configuring the first doorbell 202a to wirelessly communicate with the first remote computing device 204a. Some embodiments include joining, by the first remote computing device 204a, a doorbell user group 400 that comprises a second user of the second doorbell 202b having a second camera coupled to the second building 300b. The doorbell user group 400 can also include a third user of a third doorbell 202c having a third camera coupled to the third building 300c. The second doorbell 202b can be configured to wirelessly communicate with the second remote computing device 204b.

Some embodiments include receiving, by the first remote computing device 204a, a first visitor picture 410 that was taken by the second doorbell 202b or the third doorbell 202c. For example, arrow 416 shows how the first visitor picture 410 from the second doorbell 202b can be sent to the second remote computing device 204b and/or to the user group 400 (in some cases without passing through the second remote computing device 204b). Arrow 418 represents that the second remote computing device 204b can send the first picture 410 to the user group 400 and/or can send permission for members of the user group 400 to view the first picture 410 to the user group 400. Arrow 420 represents how the user group 400 can send the first picture 410 to the first remote computing device 204a and/or to the third remote computing device 204c.

As used herein, "user groups" often do not include humans, but instead include devices owned by various humans. For example, a neighborhood association may decide to purchase doorbells 202a, 202b, 202c. Creating a doorbell user group can include communicatively coupling the doorbells 202a, 202b, 202c and the remote computing devices 204a, 204b, 204c as shown in FIG. 10. As a result of this communicatively coupling, members of the neighborhood association can share visitor information. A doorbell user group can include the doorbells 202a, 202b, 202c and/or the remote computing devices 204a, 204b, 204c. User groups 400 can include databases 390, servers 404, and information 406 regarding the owners of the doorbells 202a, 202b, 202c and the remote computing devices 204a, 204b, 204c. User groups 400 can include the locations of each doorbell in the user group 400. User groups 400 can store visitor pictures and visitor information for future reference by members of the user groups 400.

Referring now to FIG. 11, embodiments can include receiving from the doorbell user group 400, by the first remote computing device 204a, the first visitor picture 410 taken by the second doorbell 202b even though the first remote computing device 204a is not communicatively coupled to the second doorbell 202b. Embodiments can also include receiving, by the first remote computing device 204a, a first trait regarding a first visitor 402a in response to a second user of the second remote computing device 204b inputting the first trait into the second remote computing device 204b. For example, the second user can label the first visitor 402 as "suspicious" and/or can record a description of the first visitor 402a.

Several embodiments include taking a second visitor picture 412, by the first doorbell 202a, and sending the second visitor picture 412 to the doorbell user group 400 such that the second remote computing device 204b and the third remote computing device 204c can display the second visitor picture 412 even though the second remote computing device 204b and the third remote computing device 204c are not communicatively coupled to the first doorbell 202a The doorbell user group 400 can comprise a database 390 that includes many visitor pictures taken by more doorbells that are communicatively coupled to the doorbell user group 400. The database 390 can include a first visitor picture 410 taken by the second doorbell 202b of the second building 300b. The first doorbell 202a of the first building 300a can take a second visitor picture 412. At least a portion of the doorbell system 408 can determine that the first visitor picture 410 and the second visitor 412 picture show a visitor (i.e., show the same person). Embodiments can include labeling the visitor with solicitor information such that members of the doorbell user group 400 can see the first visitor picture 410 associated with the solicitor information. For example, the remote computing devices 204a, 204b, 204c can download the first visitor picture 410 (or another visitor picture) and information regarding the visitor's solicitation behavior. The remote computing devices 204a, 204b, 204c can display the solicitor information along with the picture of the solicitor.

Users can type information regarding visitors into their remote computing devices 204a, 204b, 204c. The user group 400 can then share this information with members of the user group 400. Some embodiments include alerting the members regarding at least a portion of the solicitor information. This alert 422 can include a picture of the solicitor and other information regarding the solicitor. Several embodiments include receiving a solicitor alert 422 in response to the second doorbell 202b of the second building 300b and the third doorbell 202c of the third building 300c detecting a visitor (e.g., detecting the same person within a predetermined time, which can be within 24 hours).

The alerts 422 shown in FIG. 11 can also be burglary alerts. Some embodiments include sending an alert 422 to members of the doorbell user group 400 in response to detecting a burglary of the first building 300a. A remote burglar detection system (e.g., a remote sensor 242 of an alarm system), can detect the burglary. The remote sensor 424 can also be a fire alarm or smoke alarm. Some embodiments include sending an alert 422 to members of the doorbell user group 400 in response to a remote sensor 424 detecting fire and/or smoke.

A doorbell system 408 can comprise a first doorbell 202a having a first camera coupled to a first building 300a, wherein the first doorbell 202a is communicatively coupled to a first remote computing device 204a; a second doorbell 202b having a second camera coupled to a second building 300b, wherein the second doorbell 202b is communicatively coupled to a second remote computing device 204b; and a doorbell user group 400 comprising a database 390 having images 410, 412 taken by the first camera and the second camera. The doorbell user group 400 can be communicatively coupled to the first remote computing device 204a and the second remote computing device 204b.

In several embodiments, the first doorbell 202a is not communicatively coupled to the second remote computing device 204b, and the second doorbell 202b is not communicatively coupled to the first remote computing device 204a while the system 408 is configured such that the first remote computing device 204a receives a first visitor picture 410 taken by the second doorbell 202b via the doorbell user group 400. A second visitor picture 412 can be taken by the first doorbell 202a and displayed by the second remote computing device 204b.

The doorbell system 408 can also include a remote sensor 424 configured to monitor the first building 300a and detect an unauthorized building intrusion. The doorbell system 408 can include at least one alert 422 sent to the doorbell user group 400 in response to the remote sensor 424 detecting the unauthorized building intrusion.

Several embodiments include a solicitor alert sent to the doorbell user group 400 in response to a visitor being detected by the first doorbell 202a at the first building 300a and by the second doorbell 202b at the second building 300b.

Information collected from the doorbells 202a, 202b, 202c can be analyzed (e.g., by the system). An alert 422 can be send to remote computing devices 204a, 204c in response to analytics based on the collected information.

Aggregated doorbell information can be analyzed to look for trends and abnormal behaviors that might be correlated with crime or other unwanted behavior. Analytics can include the number of visits or visitors to a particular building, group of buildings, or area. For example, a high number of unique visitors could suggest an illegal business is being operated out of a home (e.g., drug dealing). Analytics can also evaluate how long visitors wait at a door before leaving. In some cases, analytics include determining whether a person with a criminal history or arrest warrant is contacting more than one building in an area within a predetermined time.

Several embodiments include taking, by the second doorbell 202b, a first visitor picture 410; sending, by the second doorbell 202b, the first visitor picture to the user group; and comparing, by the user group 400, the first visitor picture 410 to criminal pictures of a database 390. A moderator (e.g., a person who acts as an administrator of the user group 400) can compare visitor pictures to determine if the pictures show the same person (e.g., a solicitor) or show a criminal. Some embodiments use computer image recognition to compare images.

The first building 300a can include an alarm 434 that can be located remotely relative to the first doorbell 202a. In some embodiments, the doorbell 202a is communicatively coupled to the alarm 434. The alarm 434 can include a speaker and electronics configured to enable the speaker to emit an alarm sound.

A button on the user interface of the first remote computing device 204a can enable a user to active the alarm 434. In response to a signal from the remote sensor 424, the system 408 can enter an Alarm State, which can include recording, by the first doorbell 202a, a video; blinking a light 216, 220 (shown in FIG. 1) of the first doorbell 202a; and emitting an alarm sound from a speaker 488 (shown in FIG. 4) of the first doorbell 202a. Other members of the user group 400 can receive an alert 422 regarding the Alarm State. Other members can also see a flashing light and hear the alarm sound from the first doorbell 202a. As a result, the first doorbell 202a can serve as a beacon to first responders, which can include neighbors, medical personnel, and law enforcement officers.

Each member of the user group 400 can choose which members receive alerts, visitor pictures, and visitor information from the choosing member. This approach enables sub-groups within a larger user group.

Some embodiments enable the ability for a user to trigger an alert button (e.g., on an app that is run on a computing device), which causes the system to send images (e.g., a video) to remote computing devices (e.g., smartphones) of other users in the doorbell user group. Several embodiments enable the ability for a user to trigger an alert button that causes the system to send commands to other doorbells in the user group. The commands can cause other doorbells to emit sounds, emit lights, and/or record videos. For example, a user might see a person acting suspiciously (e.g., peering into windows). The user can press a button on a doorbell app on her smartphone. Pressing the button can cause the user's doorbell to emit an alarm sound or light. Pressing the button can cause the user's doorbell to start recording a video (e.g., to try to record a video of the person acting suspiciously). The video, however, might not capture the person acting suspiciously, so the system can also tell neighbors' doorbells to record video. Having multiple doorbells recording videos simultaneously can increase the odds of recording a video of the person acting suspiciously. To scare the person away, all the doorbells in the user group can emit a sound or light (e.g., a strobe light). The sound emitted can be a verbal message to the person.

The videos recorded in response to the user triggering the alert button can be flagged (e.g., labeled) as videos related to the alert event (e.g., recorded in response to the user pressing the alert button). The videos can be saved in such a way that there is an identifier regarding the videos to indicate the videos are related to an emergency event. The videos can be shared and saved in a way that makes them accessible to members of the doorbell user group. Members of the doorbell user group can comment regarding the person acting suspiciously and/or regarding the videos. The comments can be associated with the videos such that other members of the doorbell user group can read the comments and reply to the comments. For example, a member can reply that the person acting suspiciously was actually just the person he hired to babysit his children. The videos can be saved in the cloud for easy access from diverse locations.

Alerts and videos can be sent to members of the doorbell user group via texts, push notifications, emails, and/or any suitable means. Members can choose the means by which they are notified.

In some embodiments, the videos are monitored by a central monitoring service. The central monitoring service can see an emergency in the videos and can decide what action is appropriate. For example, the central monitoring service can call the police, an ambulance, and/or the fire department. In some embodiments, a member of the doorbell user group presses a button on the doorbell app, which sends an alert to a third-party monitoring facility.

In some embodiments, the doorbell system uses doorbell cameras to take pictures, which are then analyzed using facial recognition to detect when the same person has visited multiple homes in a neighborhood. The system can use machine learning to optimize its ability to detect when the same person visits multiple houses (e.g., within a brief period of time). The system can proactively alert a doorbell user group to be cautious and attentive regarding the person. Even if the system does not know the identity of the visitor (e.g., due to being a friend of a member of the doorbell user group), the system can still identify that the person is a solicitor due to determining that the visitor has visited multiple doorbells in the neighborhood.

Users can automatically post videos from alerts to allow user groups to discuss the videos in a section of the app. Thus, the system can encourage communication among members of the group.

In some embodiments, the system is configured to predict future issues such as home burglaries. Machine learning can be used to identify traits and behaviors indicative of burglaries. These traits and behaviors can include peeking in windows, looking around outside a house, staring at the house for a suspicious amount of time, and/or exhibiting traits that were exhibited by past burglars. Data from the doorbells and/or future predictions can be sent to a third party such as a real estate service like Zillow.

The system can analyze historical data to predict future events. For example, if crime typically increases in a neighborhood a week before Christmas, then the system can send an alert regarding the heightened risk to members of the doorbell user group.

The system can use machine learning to analyze alert data and determine the time of day, which days of the week, and the frequency of alerts to anticipate future crime risk and send alerts ahead of time. The system can also use machine learning and data analysis to plot all alerts by location (e.g., by zip code) to produce a safety score that represents a crime risk for the location. The safety score can be given to third parties like Zillow. Zillow can then show the safety score to potential real estate buyers to help the buyers understand the estimated crime risk of a location. The safety score can be based on many factors including the number of user submitted alerts and crime data from police databases. Data from doorbells can be combined with data from other sources (e.g., police reports, sex offender databases) to determine the safety score.

Information regarding safety can be sent to members of doorbell user groups periodically (e.g., weekly or monthly). Safety data (e.g., the safety score) can be sent to social networks (e.g., Facebook) and websites (e.g., Airbnb).

The safety score can be a number on any suitable scale (e.g., 1 to 10). A higher number can indicate a safer neighborhood. The safety score can be a number of stars (e.g., a 4.4 star rating out of 5 stars).

Information from several neighborhoods can be analyzed to extrapolate the data to other neighborhoods (such as adjoining neighborhoods). If a criminal or solicitor is identified in one neighborhood, users of doorbell user groups in nearby neighborhoods can also receive a warning via their remote computing devices.

The system can also use videos from non-doorbell cameras (e.g., outdoor security cameras) and data from locks. Data can be shared between many homes. The system can also include information regarding a "home" or "away" state of the occupants of each home. For example, the system can enter a heightened security state if the occupants of a home are away from the home when the system detects suspicious indicators and/or visitors.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A method of using a doorbell system, wherein the doorbell system comprises a software application configured to run on a first remote computing device communicatively coupled to a first doorbell having a housing, a motion detector, a proximity sensor, a microphone, a speaker, a button, and a first camera, the method comprising:
    displaying a map, via the software application on the first remote computing device, wherein the map displays a first location of the first doorbell and a second location of a second doorbell;
    receiving a selection by a user of a map icon representing the second doorbell;
    displaying information regarding the second doorbell, via the software application on the first remote computing device, in response to receiving the selection by the user of the map icon representing the second doorbell while the map icon is displayed via the software application on the first remote computing device;
    sending a wireless communication to a second remote computing device in response to receiving the selection by the user of the map icon representing the second doorbell via the software application on the first remote computing device, the wireless communication comprising an invitation to an owner of the second doorbell to a doorbell user group; and
    creating the doorbell user group comprising the first remote computing device and a second remote computing device that is communicatively coupled to the second doorbell but is not communicatively coupled to the first doorbell.

2. The method of claim 1, further comprising sending, by the doorbell system, an alert to the doorbell user group in response to a selection of a first button on the first remote computing device.

3. The method of claim 2, wherein the alert is selected from the group consisting of a video an image taken by the first doorbell, and combinations thereof.

4. The method of claim 1, wherein the first doorbell is coupled to a first building, and a remote sensor is configured to detect an unauthorized intrusion of the first building, the method further comprising sending an alert sent to the doorbell user group in response to the remote sensor detecting the unauthorized intrusion.

5. The method of claim 4, wherein the alert comprises a visual media selected from the group consisting of a video an image taken by the first doorbell, and combinations thereof.

6. The method of claim 4, further comprising sending an alert to members of the doorbell user group in response to detecting, by a remote burglar detection system, a burglary of the first building, wherein the alert comprises a visual media selected from the group consisting of a video an image taken by the first doorbell, and combinations thereof.

7. The method of claim 1, wherein the first remote computing device is not communicatively coupled to the second doorbell, the method further comprising receiving a second picture taken by the second doorbell in response to the second doorbell sending the second picture to a database configured to provide visitor information to the doorbell user group.

8. The method of claim 1, wherein the first doorbell is coupled to a first building, the second doorbell is coupled to a second building, and a third doorbell is coupled to a third building, the method further comprising analyzing information collected from the first doorbell, the second doorbell, and the third doorbell, and then sending an alert in response to facial recognition of the information, wherein the facial recognition is configured to detect a first visitor having visited the first building, the second building, and the third building.

9. The method of claim 1, further comprising sending an alert to the first remote computing device and the second remote computing device in response to the first doorbell and the second doorbell providing the same information regarding a first visitor to the doorbell user group.

10. The method of claim 1, further comprising sending an alert to the first remote computing device in response to identifying, by the doorbell system, abnormal behaviors correlated with crime.

11. A method of using a doorbell system, wherein the doorbell system comprises a first remote computing device communicatively coupled to a first doorbell having a housing, a motion detector, a proximity sensor, a microphone, a speaker, a button, and first camera, the method comprising:
    creating a doorbell user group comprising the first remote computing device and a second remote computing device that is communicatively coupled to a second doorbell but is not communicatively coupled to the first doorbell;
    taking a first picture, via the first camera of the first doorbell, of a first visitor;
    sharing the first picture with the doorbell user group such that the second remote computing device receives the first picture;
    sending the first picture to a database configured to provide information regarding the first visitor to the doorbell user group; and
    recording comments regarding the first picture from the doorbell user group such that members of the doorbell user group can read the recording comments.

12. The method of claim 11, further comprising sending, in response to a selection of a first button on the first remote computing device, a communication to at least a portion of the doorbell user group,
    wherein the communication is configured to cause the first doorbell and the second doorbell to simultaneously perform an action selected from the group consisting of recording videos to capture evidence regarding an emergency situation in a neighborhood of the first doorbell and the second doorbell, emitting an alarm sound in response to the emergency situation, emitting lights in response to the emergency situation, and combinations thereof.

13. The method of claim 12, further comprising recording comments regarding a visual media selected from the group consisting of the videos the first picture from the doorbell user group, and combinations thereof such that members of the doorbell user group can read the recording comments.

14. The method of claim 11, further comprising receiving a first trait of the first visitor from the first remote computing device, and sharing the first picture of the first visitor with the doorbell user group in response to the first trait of the first visitor.

15. The method of claim 11, further comprising indicating a first trait of the first visitor, wherein providing information regarding the first visitor to the doorbell user group includes the first trait of the first visitor.

16. The method of claim 11, further comprising coupling the first doorbell to an exterior surface of a first building.

17. The method of claim 16, further comprising coupling the second doorbell to an exterior surface of a second building.

18. The method of claim 17, further comprising sending an alert to the first remote computing device in response to analyzing a combination of the information and a database of past criminal activity in an area of the first building and the second building; and
   predicting, by the doorbell system based at least partially on an information source selected from the group consisting of the information, the database and combinations thereof, a likelihood of future criminal activity.

19. The method of claim 17, further comprising determining, by the doorbell system based at least partially on the information and on a database of past criminal activity in an area of the first building and the second building a safety score of the area and sending the safety score to a third party in a manner configured to enable the third party to display a safety metric based at least partially on the safety score with real estate listings.

20. The method of claim 17, further comprising sending an alert to the first remote computing device in response to determining a number of visits of a visitor to a group of buildings comprising the first building and the second building.

* * * * *